FIG. 6  PAC SELECTION MATRICES
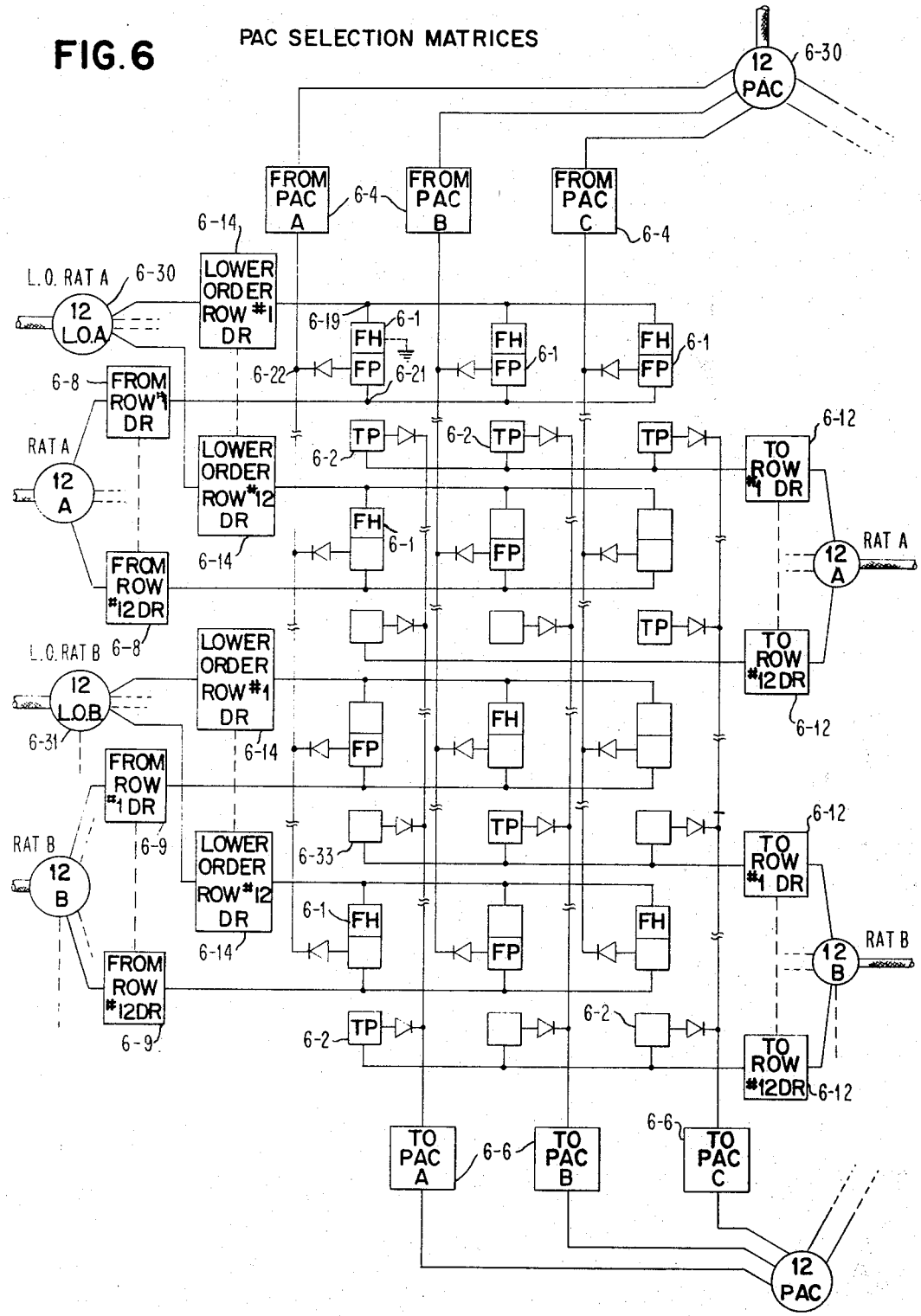

FIG. 7b
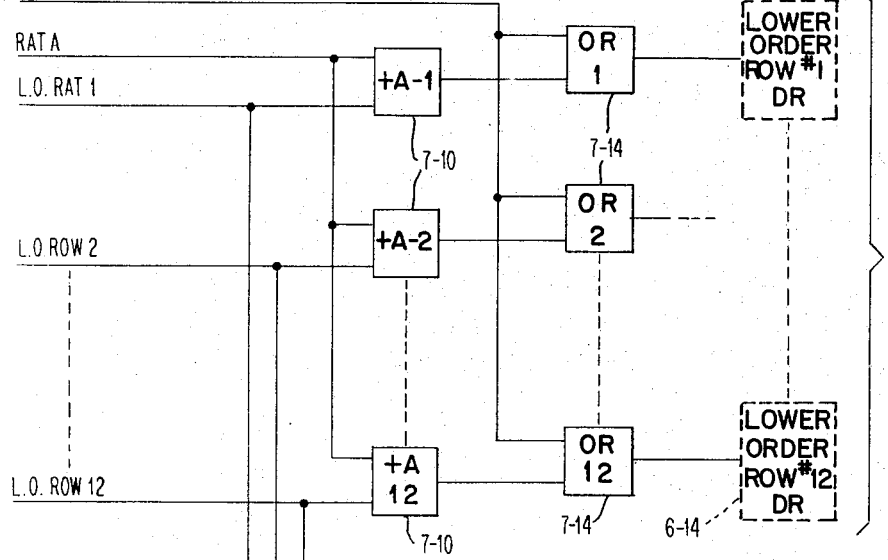
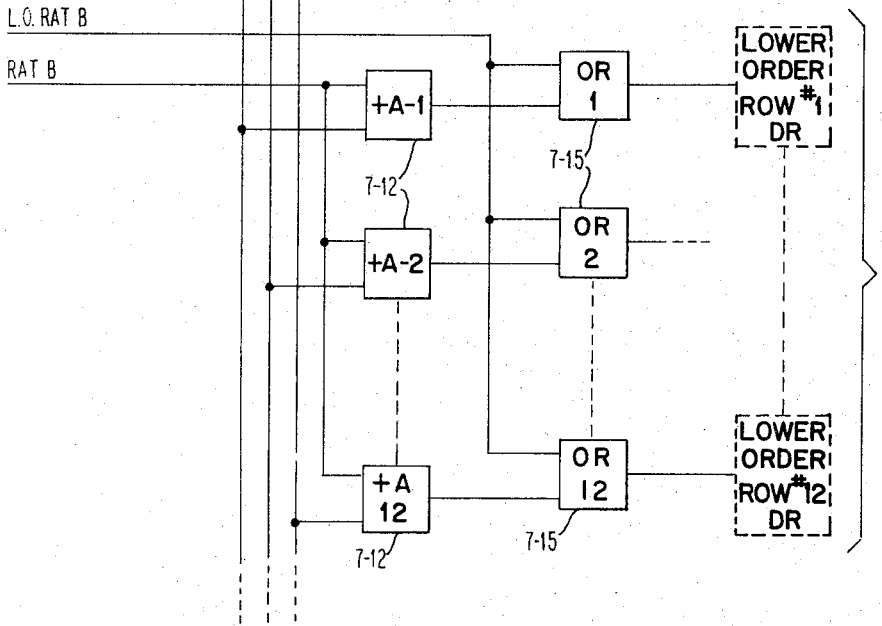

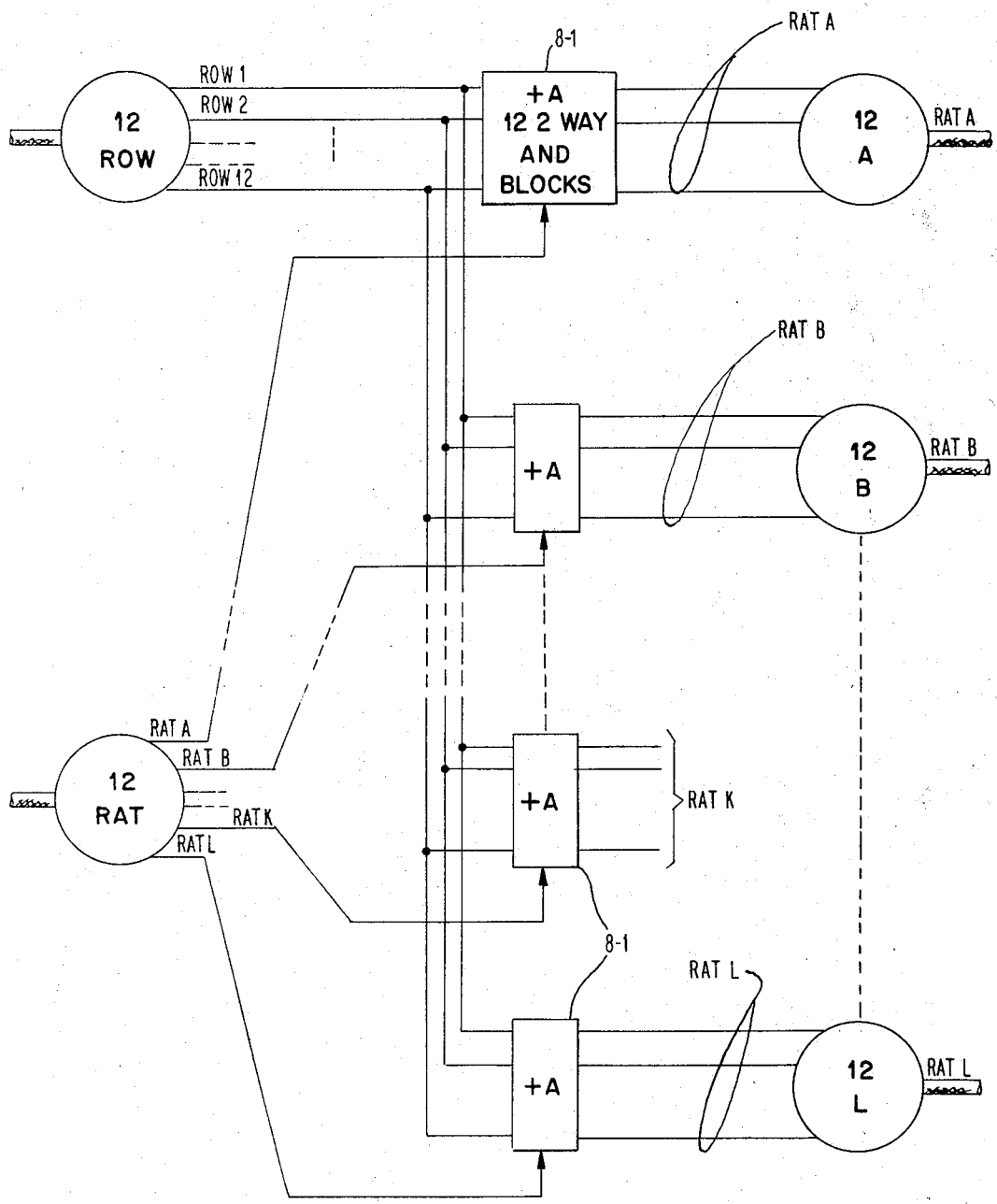
FIG. 8a  PICK COIL DECODERS

FIG. 9     TO PIN SELECTION MATRIX
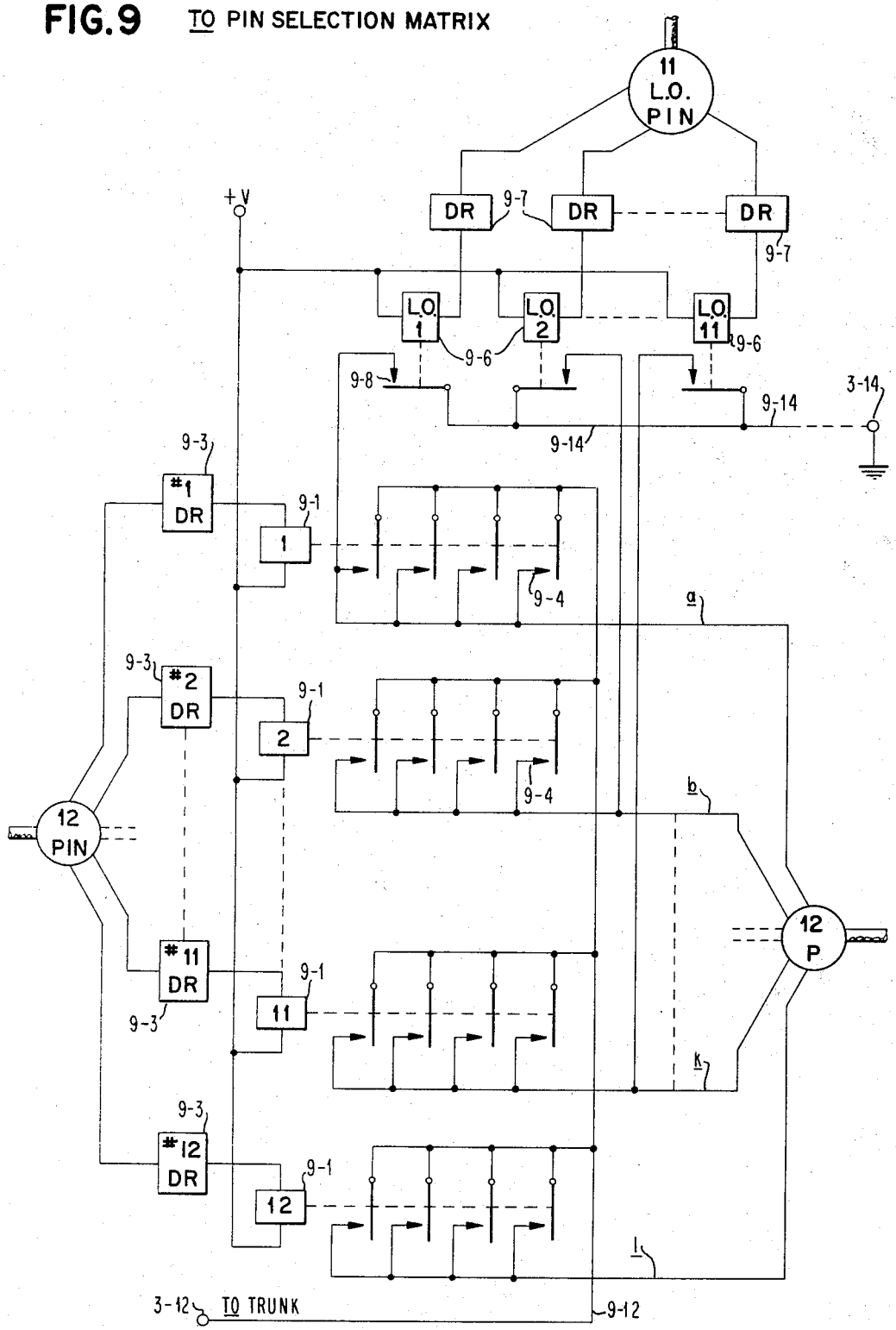

United States Patent Office 3,441,849
Patented Apr. 29, 1969

3,441,849
TESTING AND ADDRESSING APPARATUS FOR AN ARRAY OF CIRCUIT ELEMENTS
Jack P. Bennett, West Hurley, N.Y., Charles A. Harring, Raleigh, N.C., and William Teo, Berkeley, Calif., assignors to International Business Machines Corporation, Armonk, N.Y., a corporation of New York
Filed Jan. 13, 1967, Ser. No. 609,085
Int. Cl. G01r 15/12, 31/02
U.S. Cl. 324—73
10 Claims

ABSTRACT OF THE DISCLOSURE

Disclosed is a circuit tester for detecting shorts and opens in large electrical circuit arrays or other large multiple-element electrical devices. Selection units for addressing the elements to be tested employ coincident selection allowing variable sized groups to be addressed. A scan counter in cooperation with an address register addresses groups of decreasing and increasing size to detect the particular faulty element within an initially large group, and a group size decoder in cooperation with the above allows the selection of decreasingly smaller or larger groups wholly within or containing, respectively, the preceding group addressed.

BACKGROUND AND OBJECTS OF THE INVENTION

Many prior art testers have been designed for testing circuit arrays having a relatively small number of elements. For this reason prior art testers have generally employed a mode of operation that is inherently slow when extended to very large circuit arrays. Some prior art testers include addressing or selecting circuitry for automatically connecting the elements or terminals to the unit which carries out the desired test. These addressing circuits typically employed a fixed seriatim mode of operation limited to the selection of a single element or a single pair of elements at any one time. This limitation to seriatim selection prohibits the simultaneous connection of large numbers of elements at any one time. Lack of the ability to address large groups of elements at one time, of course, prevents the variation in size of the group of elements selected.

Some prior art addressing circuits used in testers include registers (a serially connected series of bistable circuits such as latches, flip-flops, etc.) for distributing the addressing signals to the elements addressed. The use of registers is useful for reasons such as providing a temporary storage for the addresses of the addressed elements and may be used to identify the addressed elements if an error is detected. Prior art addressing circuits including registers have not, however, been organized so as to permit the orderly selection of the group of elements desired to be addressed where that group may range in size from one to all the elements.

In accordance with the above background of the invention, it is an object of this invention to test large circuit arrays in an improved, faster manner than heretofore possible.

It is another object of this invention to test circuit arrays for electrical properties such as shorts and opens in an improved manner.

It is a further object of this invention to address in an improved manner groups of elements in an array where the group may range in size from one to all the elements in the array.

It is an additional object of this invention to scan an array of elements by selecting groups of elements of a variable size.

It is a second additional object of this invention to scan an array of elements by addressing groups of decreasing size.

BRIEF SUMMARY OF THE INVENTION

This invention relates to a tester or other device including an apparatus for addressing specified groups of elements out of a total array of elements using multiple coincident selection under the direction of a control unit. The invention is particularly useful in testing large circuit arrays for opens and shorts. The testing is carried out by an apparatus which (a) addresses the first element (pin) or first elements (pins) to be tested, (b) addresses a large group of remaining elements (pins) and connects them in common, (c) determines if an electrical condition exists between the first element(s) and the remaining elements, (d) addresses other large groups of elements if the electrical condition desired exists, and (e) scans a particular large group by sequentially addressing smaller groups, each succeeding one within the preceding larger one, until the element(s) causing the failure to satisfy the condition is located.

One feature of the inventive apparatus for carrying out the above functions includes a scan counter incrementing the addresses in an address register which in turn selects through the coincident energization of half-select units the elements addressed.

Another feature of the invention lies in half-select units, energized by an address register, in which multiple coincident selection is achieved in half-select unit by the coincident energization of at least two quarter-select means. After addressing the desired elements in this manner, the desired test (or other function) is carried out whereafter a new test or selection of elements occurs.

A further feature of this invention resides in an apparatus having a control unit including a scan counter which specifies to an address register and to a group size decoder the location and size of a group to be addressed. After the initial addressing of a relatively large group of elements and the determination is made that the desired element is within that large addressed group, the control unit gates the group size decoder thereby allowing the scanning under control of a scan counter of smaller groups wholly contained within the larger group until the particular smaller group which is desired has been located. All of the above is achieved without decrementing the address in the address register.

The foregoing and other objects, features, and advantages of the invention will be apparent from the following more particular description of the preferred embodiments of the invention, as illustrated in the accompanying drawings.

BRIEF DESCRIPTION OF THE DRAWINGS

FIG. 6 shows two half-select circuits comprising a plurality of FIG. 4 and FIG. 5 relays organized into FROM and TO PAC Selection Matrices.

FIG. 7(a) shows a group size decoder which feeds the

Lower Order FROM Hold Coils of the FIG. 6 FROM PAC Matrix; FIG. 7(b) shows the circuit of FIG. 7(a) in greater detail.

FIG. 8(a) shows a group size decoder which is connected to both the TO and FROM Pick Coils of the FIG. 6 Matrices.

FIG. 9 shows a half-select unit comprised of a TO Pin Selection Matrix.

GENERAL DESCRIPTION

Figure 1A:
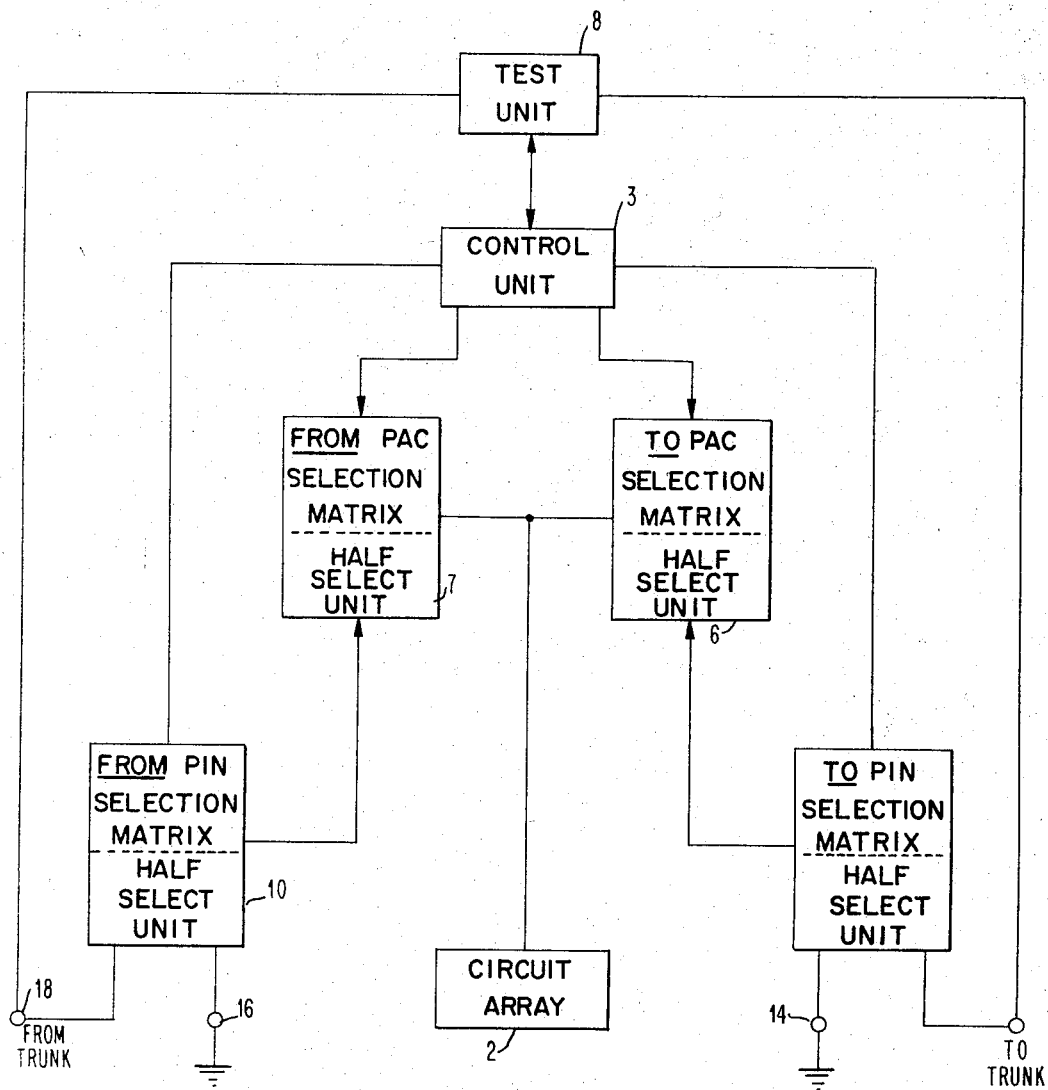
FIG. 1(a) shows a general block diagram of the apparatus embodying the invention.

FIG. 1 shows the invention in block diagram form. In FIG. 1(a), the circuit array 2 is to be tested for certain electrical characteristics such as shorts and opens. The circuit array 2 is shown in greater detail in FIG. 2 where it can be seen that the array, in the embodiment shown, consists of a plurality of elements (e.g., contact points, pins, terminals, etc.) arranged in 144 rows and 144 columns. Some of the elements are connected to form networks (shown by dotted lines) and therefore have electrical continuity therebetween. Typical tests performed upon the circuit array include checking each element to assure that it is not improperly connected (shorted) to any other element in the array and checking to assure that each element that should be in a network is not open and accordingly has proper electrical continuity with the other elements in that network.

Briefly with reference to FIG. 1(a), electrical contact is made with an element or network in circuit array 2 by energizing particular bistable connectors in the TO half-selection units 6 and 9. These units, PAC and PIN, are defined as half-select units because connectors in both a PAC and a PIN matrix must be energized before electrical contact is made with any element (or a series of elements) in circuit array 2. The Control Unit 3 addresses the particular elements desired by gating addresses to the TO matrices 6 and 9. The addressed elements in circuit array 2 are connected through the half-select units 6 and 9 to either ground (or other potential) at terminal point 14 or to the TO TRUNK at terminal 12.

In a similar manner, elements or networks in circuit array 2 are addressed by the FROM half-select units 6 and 10, that is, the FROM PIN and PAC Selection Matrices, respectively. Similarly, the elements in circuit array 2 addessed and selected by the FROM matrices are connected to the FROM TRUNK at terminal 18 or to ground (or other potential) at terminal 16.

With the addressing completed and the selection of the elements in circuit array 2 by the FROM and TO matrices, the Control Unit 3 energizes the test unit 8 (or other circuitry) thereby causing the desired test (or other function) to be performed. The results of the function performed are sensed by test unit 8 and fed to the Control Unit 3 where the appropriate action is determined and commanded.

DETAILED DESCRIPTION

FIG. 1(b)

Figure 1B:
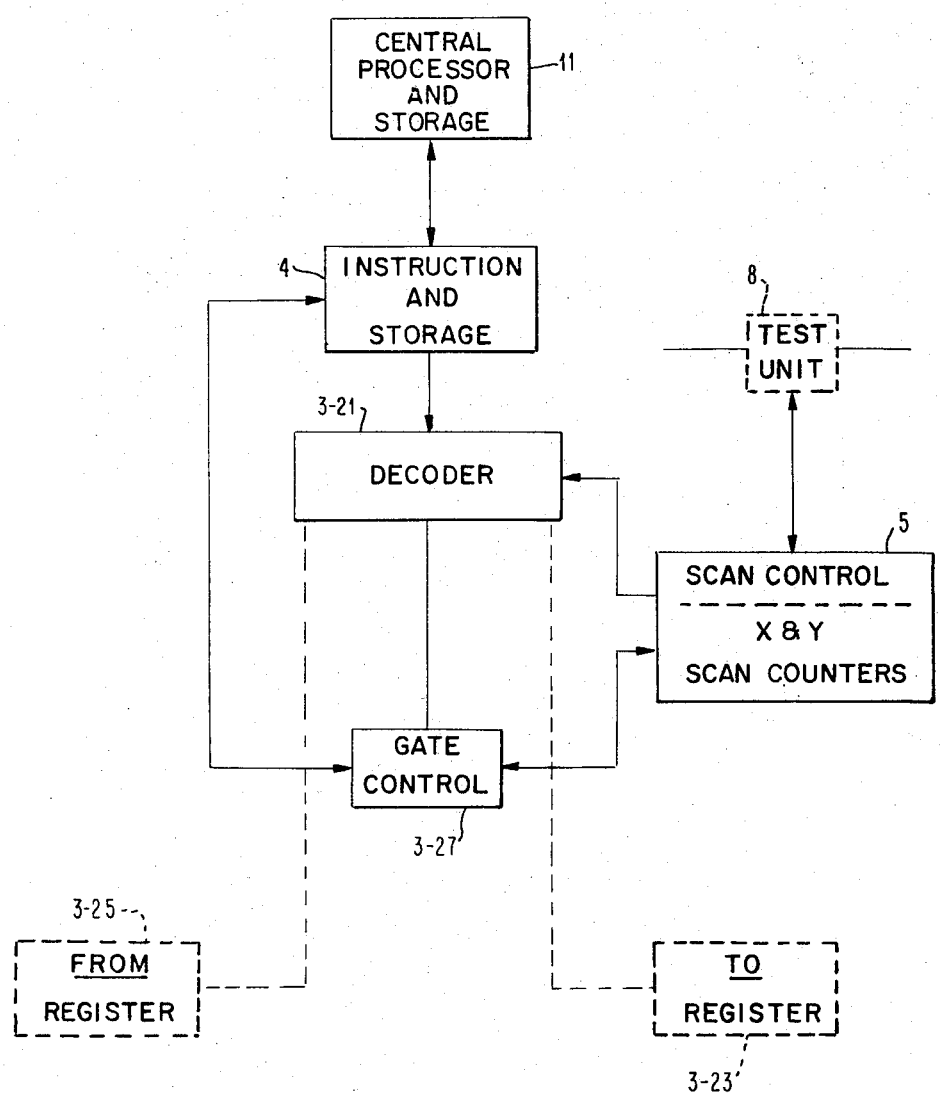
FIG. 1(b) depicts the Control Unit 3 of FIG. 1(a) in greater detail.

FIG. 1(b) depicts the Control Unit 3 of FIG. 1(a) in greater detail. Control Unit 3 includes, in a preferred embodiment, an Instruction and Storage Unit 4 which is adapted to receive information from a standard Central Processor and Storage Unit 11. Unit 11 may be a standard computer, tape drive, or other similar unit. Since unit 11 ordinarily will be constrained to operate in a given mode, such as a binary mode, the Instruction and Storage Unit 4 will preferably operate in the same mode. Unit 4 preferably includes storage registers for receiving the addresses of elements to be tested and instructions for the type of test to be performed. The instructions are passed to the gate control 3–27 which employs conventional circuitry to establish the appropriate gating as will be explained in further detail below. The addresses of the desired elements to be tested are taken from the storage registers of Unit 4 and passed through the Decoder 3–21 and are in turn passed to the TO or FROM registers 3–23 and 3–25, respectively. Decoder 3–21 converts the mode of operation (e.g., binary) of units 4 and 11 to the RAT, ROW, PAC, PIN mode of operation of the rest of the tester as will be explained in detail below.

Control Unit 3 also includes, in the preferred embodiment, a Scan Controlled unit 5 which includes X and Y scan counters. The unit 5 is connected to the Test Unit 8 of FIG. 1(a) and also to the Gate Control 3–27. The Control Units 3–27 and 5 operate to energize the Test Unit 8 after the proper elements have been addressed and the control units 3–27 and 5 also receive the results of the test from Test Unit 8 and initiate the appropriate action according to the test results. If a scan routine is called fro, the X and Y Scan Counters serially scan from 1 to 12 or to 144 in increments of 12. The counters in unit 5 may be conventional binary counters with suitable control logic for resetting or counting in groups of 12. The output from the counters is fed through the Decoder 3–21 to decode from the binary mode of operation to the RAT, ROW, PAC, PIN mode of operation.

FIG. 2

Figure 2A:
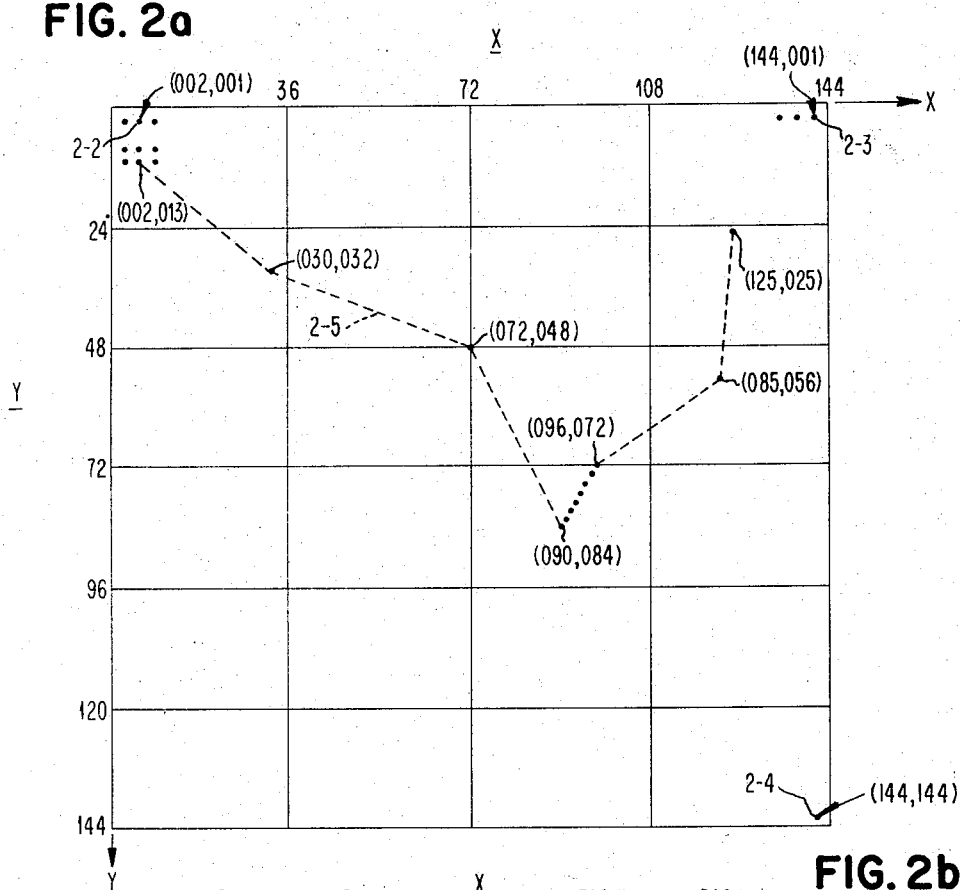
FIGS. 2(a) and 2(b) show a circuit array to be tested and the manner of ordering the elements or pins therein.

FIG. 2(a) depicts a typical circuit array to be tested. The array includes a plurality of pins (elements) which serve as connection points for electrical circuits. The pins are organized, for convenience, in 144 rows and 144 columns. The columns are designated by an X coordinate and the rows by a Y coordinate. By means of the X and Y coordinates, each pin is assigned an address. Accordingly, pin 2—2 in the second column of the first row has an address designated by (002,001), the pin 2–3 in the last column of the first row has an address of (144,001), the pin 2–4 appearing in the last column of the last row has an address (144,144), and so forth. Some of the pins are connected in a network such as represented by the dotted line 2–5 connecting pins (002,013), (030,032), (072,048), and (090,084).

Although the mechanical details of circuit array 2 are not disclosed, they are readily apparent to those skilled in the art. Such arrays are commonly cable connectors and terminals for electronic computers, but any multiple terminal network can be tested. Although the pins have been shown in a rectangular array, this arrangement is merely for convenience as any arrangement of pins, whether in two dimensions or in three dimension, may be utilized. All that is required is that a plurality of discrete pins (elements) exist such that they are capable of being assigned some arbitrary order (e.g., the X and Y coordinate ordering indicated above).

Figure 2B:
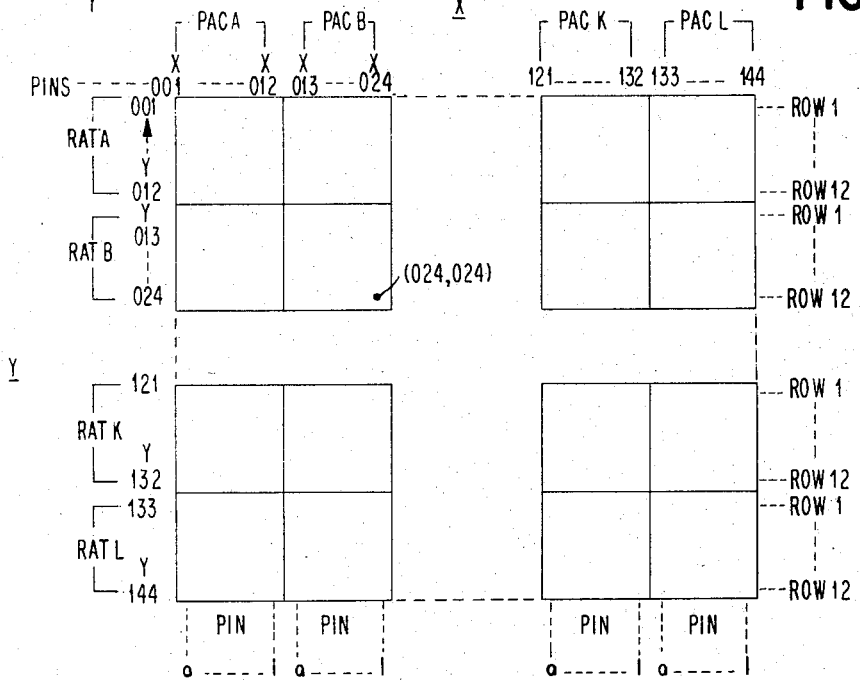

FIG. 2(b) shows an additional manner in which the circuit array 2 (shows in FIGS. 1 and 3) is organized. Besides the X–Y coordinate discussed in FIG. 2(a), the rows are further broken down into RATS A, B, . . ., K, L where each RAT contains 12 rows designated by ROW 1, ROW 2, . . ., ROW 12. In a similar manner, the 144 columns have the twelve designations PAC A, PAC B, . . ., PAC L. Each PAC contains 12 columns having designations PIN $a$, PIN $b$, . . ., PIN $l$. Using this nomenclature, groups of elements can be identified by reference to RAT, ROW, PAC, and PIN designations. For example, all the PINS having addresses $X=001$, . . ., 144; and $Y=001$, . . ., 012 would be identified as RAT A. The 144 pins having addresses $X=001$, . . ., 012; and $Y=001$, . . ., 012 would be identified as the intersection of RAT A and PAC A. In a similar manner, the intersection of RAT B, ROW 12, PAC B, and PIN *l* would be the pin having the address (024,024) as shown in FIG. 2(*b*).

FIG. 3

Figure 3A:
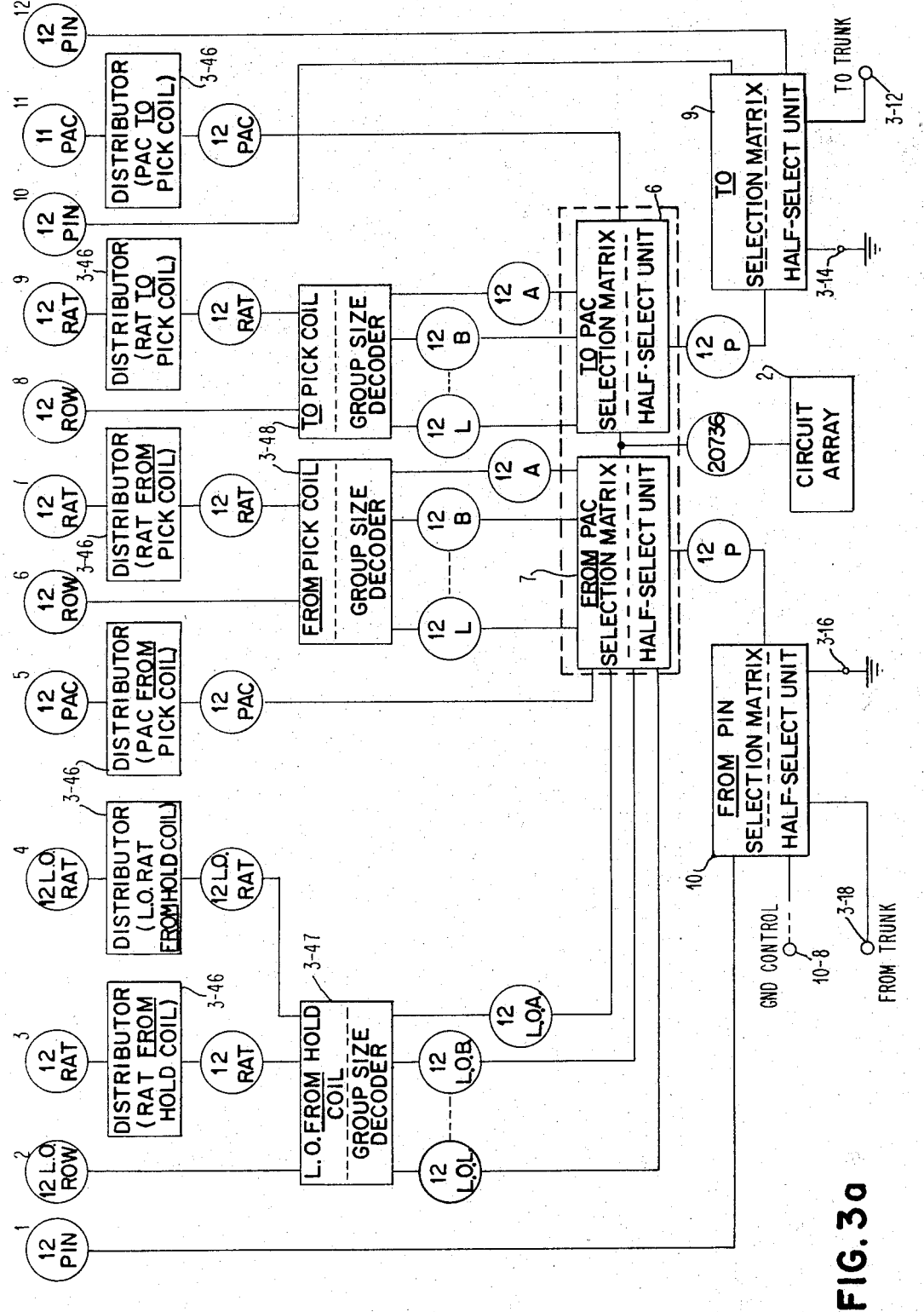
FIGS. 3(a) and 3(b) together show portions of the FIG. 1(a) circuit in greater detail.

FIGS. 3(*a*) and 3(*b*) show in greater detail the block diagram circuitry of FIGS. 1. In FIG. 3(*a*) the circuit array 2 has 20.736 contact points or pins. Those 20,736 pins are each connected to a separate terminal on bistable nection with FIGS. 4, 5, and 11. The half-select units 6, 7, 9, and 10, operate in coincidence to select (make electrical connection to) the particular pins desired in circuit array 2. When the half-select units 6 and 9 are properly energized, the addressed pins in circuit array 2 are connected either to the ground terminal 3–14 or to the TO TRUNK 3–12. In a similar manner, the FROM half-select units 7 and 10 are connected to the ground terminal 3–16 or to the FROM TRUNK 3–18. The detailed operation of the half-select units will be discussed subsequently with reference to FIGS. 6, 9, and 10.

The energization of the half-select units is under the control of the Control Unit 3 of FIG. 1(*a*) as shown in FIG. 1(*b*) and partially in FIG. 3(*b*). With continued reference to FIG. 3(*b*), the Decoder 3–21 is connected to the TO Register 3–23, the FROM Register 3–25, and the Gate Control 3–27.

The TO Register 3–23 is organized into 24 X-stages and 24 Y-stages which in turn are organized by X's into 12 PAC and 12 PIN stages, and by Y's into 12 RAT and 12 ROW stages, respectively. The X-stages and the Y-stages defined the X and Y coordinates by means of the RAT, ROW, PAC, and PIN designations in accord with the previous description with reference to FIG. 2(*b*). The FROM Register 3–25 is identical to the TO Register 3–23.

Although the FROM and TO registers have been shown as having X- and Y-stages, the X- and Y-stages could, of course, be separate registers. The registers are conventional and may consist of a series of latches, the selection of which will be apparent to those skilled in the art. The input to the registers from the Decoder 3–21 is by means of standard techniques which in the preferred embodiment includes gates under the control of Gate Control 3–27 and may employ time-division multiplexing over the buses 3–29. Ultimately, each stage must have 24 inputs as indicated by the circles 3–30 containing the number 24, the circles being used throughout the drawings to indicate the number of lines contained in the associated bus.

The output of the registers 3–23 and 3–25 is under the control of gate control 3–27. The gate control 3–27 operates under the direction of instructions from units 4 and 5 of FIG. 1(*b*). The gate control circuitry is standard and of design readily apparent to those skilled in the art. Although the specific details are not shown for the purpose of clarity, the output function of the gates is disclosed by means of the boxes 3–31, 3–32, and 3–33 with respect to the TO register 3–23; and by the boxes 3–36, 3–37 and 3–38 with respect to the FROM register 3–25. These boxes symbolically signify the output from the registers as selected by gate control 3–27. For example, if the desired output from the TO register 3–23 is only a signal from the 12 RAT stages, then gate control 3–27 selects the output symbolically represented by box 3–33. In a similar manner, if the desired output from the FROM register 3–25 is the information in the PAC, PIN, RAT, and ROW stages, then the box 3–36 is the output selected by gate control 3–27. In like manner, the input gating to busses 3–29 connected by dotted lines to the Gate Control 3–27.

The TO register stages have an output to the Lower Order (L.O.) Select units 3–41. The function of these units can best be explained with reference to FIG. 2. In FIG. 2, the pins in the circuit array have addresses consisting of an X and Y coordinate so that any particular pin $P_0$ has coordinates gives by $(X_0, Y_0)$, "Lower order" is the term used to describe every pin which has an order lower than a particular pin $P_0$ as defined by the following conditions:

for $Y<Y_0$,

All the pins represented by all X and all $Y<Y_0$ coordinates;

for $Y=Y_0$,

All the pins represented by all $X<X_0$ and $Y=Y_0$ coordinates.

The details of the Lower Order Selection circuitry which allows the units 3–41 to function in the above manner will be described below in more detail with reference to FIG. 12. Again in FIG. 3(*a*), the output of the lower order selection units is controlled by gate control 3–27 in the same manner as is the output from the TO and FROM registers 3–23 and 3–25. The output buses, however, consist of only 11 output lines for each stage. The outputs from the registers and the lower order select units are gated to the half-select units 3–6, 3–9, and 3–10 [shown in FIG. 3(*a*)]. The OR circuits 3–43 and 3–44 merely serve to combine output lines from two different stages onto the same 12 lines. For example, OR 3–44 takes eleven of the twelve RAT lines from box 3–38 and combines them with the eleven L.O. RAT lines from the Lower Order Select unit 3–41. The OR circuitry is standard and familiar to one of ordinary skill in the art and could consist, in the case of OR 3–44, of 11 two-way OR circuits with one input for each OR from box 3–38 and the other from the Low Order RAT. The twelfth line from box 3–38 would not be OR'd and would pass straight through to the half-select units. Where there are twelve inputs on each line, naturally there would be twelve two-way OR's.

The distributor circuits 3–46 are simply "switching circuits" for changing the connections between the twelve input lines and the twelve output lines. They are standard circuits which merely function to allow any one of the twelve input lines to be connected to any one of the twelve output lines where each input lines is simultaneous connected to only one output line.

The group size decoders 3–47 and 3–48 are connected between the gated outputs of the registers (3–23 and 3–25) and the half-select units shown in FIG. 3(*a*). The group size decoders function to reduce or increase the size of the group of pins being selected without need for decrementing the count in the address registers 3–23 and 3–25. The details of the group size decoders will be discussed in connection with FIGS. 7 and 8.

FIG. 4

Figure 3B:
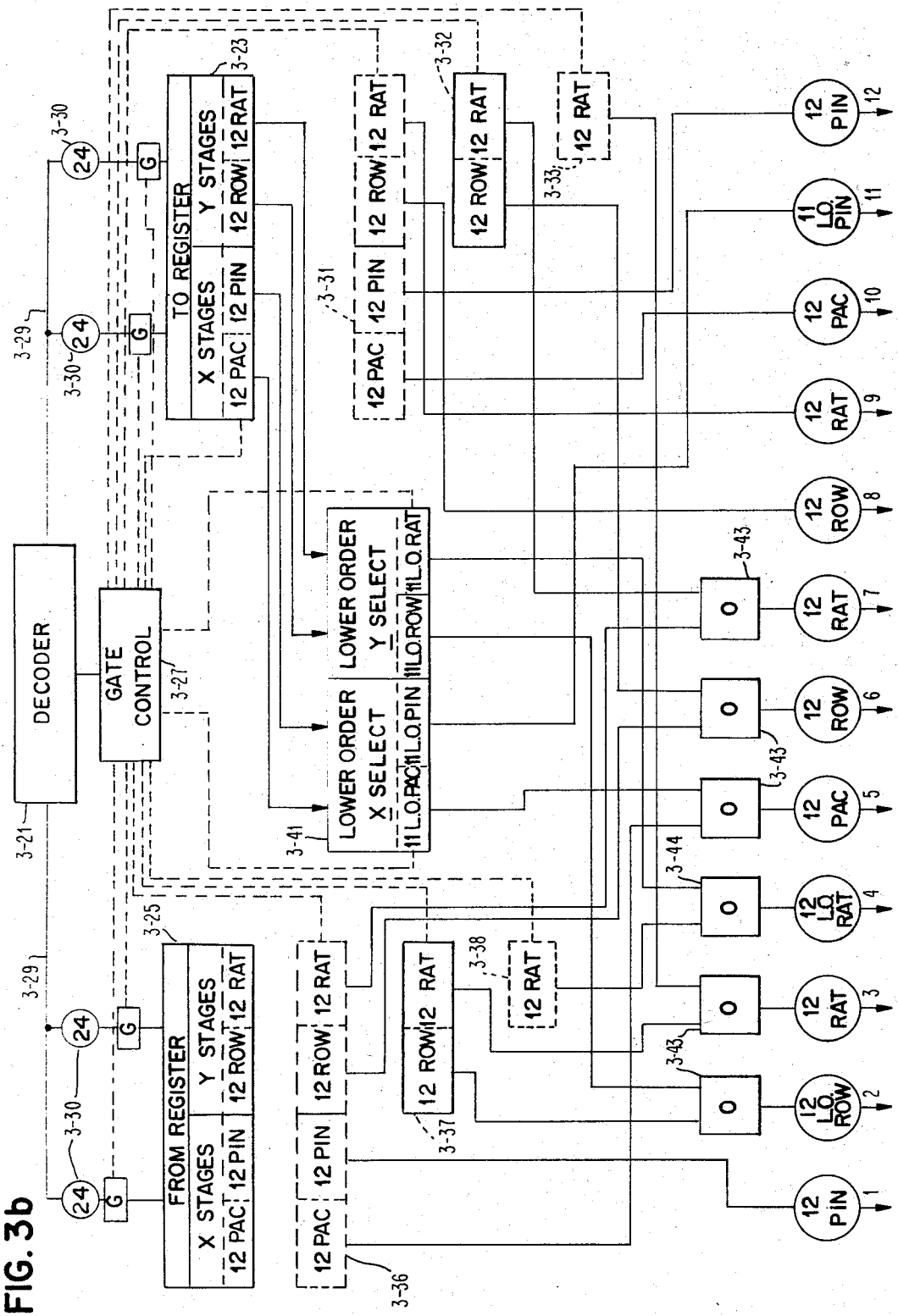
Figure 4A:
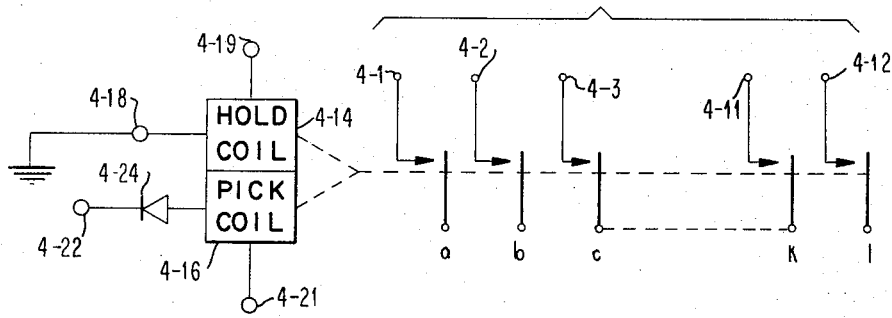
FIG. 4(a) shows a typical bistable connector which in the embodiment shown is a relay having a hold coil and a pick coil.
Figure 4B:
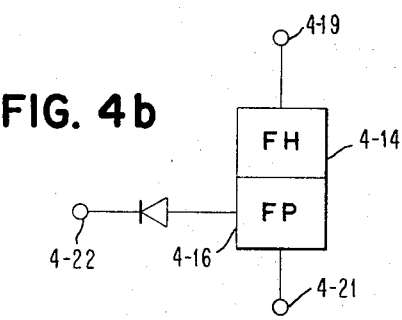
FIG. 4(b) shows a symbolic representation of the FIG. 4(a) relay.

In FIG. 4(*a*), a relay is depicted which is utilized as a bistable connector in the half-select unit 7. The relay has 12 pin terminals 4–1, 4–2, 4–3, . . . , 4–12 which are connected directly to pins in circuit array 3–2 (shown in FIG. 3). For a circuit array of 144 by 144 pins, there are 1,728 relays like that shown in FIG. 4(*a*). The terminals 4–1 to 4–12 are connected in the following manner. With reference to FIG. 2(*a*), terminal 4–1 is connected to the pin having the address (001,001). Terminal 4–2 is connected to the pin (002,001), terminal 4–3 to the pin (003,001), and so on until terminal 4–12 is connected to pin (012,001). In a similar manner, another relay has its terminal 4–1 connected to pin (013,001), and so on. The second row of pins is connected in the same manner as the first, that is, a terminal 4–1 is connected to pin (001,002) with the last terminal 4–12 connected to pin (012,002), and so on. The whole array of pins is connected in the fashion indicated so that the 20,736 terminals are connected to the 20,736 pins.

The corresponding bus terminals *a, b, c, . . . k, l* associated with the FIG. 4(*a*) relay become connected to the 4–1 through 4–12 terminals, respectively, upon energization of either the hold coil 4–14 or the pick coil 4–16 of the relay. All the bus terminals *a, b, . . . , k*, l for each of the 1,728 relays have their common lettered terminals tied together. For example, all of the *a* terminals are connected together to a common bus, all of the *b* terminals are connected together, and so on. According, all the relay terminals for the entire circuit array are connected to one of twelve buses. The bussing arrangement is shown in more detail in FIG. 11 where the connections forming the twelve buses *a, b, . . . , l* are shown.

The twelve terminals *a, b, . . . , l* are simultaneously connected to the pin terminals 4–1, 4–2, . . . , 4–12, respectively, by energization of either the hold coil 4–14 or the pick coil 4–16. The hold coils have one terminal 4–18 which is always grounded and another terminal 4–19 which is energized in a manner to be discussed in connection with FIG. 6. The pick coil 4–16 is energized when there is an appropriate signal on terminal 4–21 and when there is also another appropriate signal on terminal 4–22. The diode 4–24 connected between the pick coil and terminal 4–22 assures that the pick coil will only be energized when the voltages on terminals 4–21 and 4–22 is such that conventional current flows from terminal 4–21 to 4–22. The manner in which the pick coil terminals are connected and energized will be discussed in more detail in connection with FIG. 6. FIG. 4(*b*) depicts the symbolic representation of the FIG. 4(*a*) relay as it is drawn in FIG. 6.

In FIG. 4(*b*), the hold coil 4–14 is designated by the letters FH to signify that it makes up part of the FROM matrix in FIG. 6. In a similar manner, pick coil 4–16 is designated FP.

FIG. 6

Figure 5A:
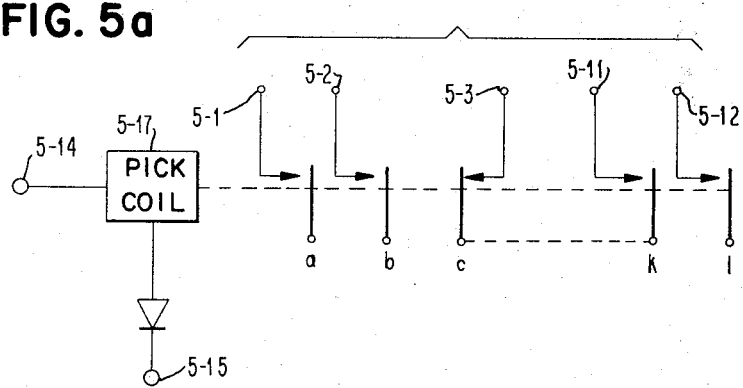
FIG. 5(a) shows another bistable connector again being a relay but having only a pick coil.
Figure 5B:
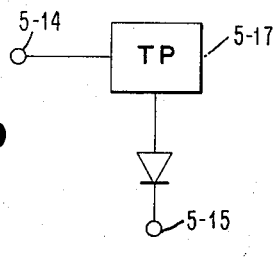
FIG. 5(b) discloses a symbolic representation of the FIG. 5(a) relay.

In FIG. 5(*a*), a relay which is used in the TO half-select unit 6 (FIG. 6) is depicted. The bus terminals *a, b, . . . , l* and their respective associated pin 5–1, 5–2, . . . , 5–12 are connected in a manner analogous to that described with reference to the relays of FIG. 4. The pick coil 5–17 is energized by appropriate signals on the terminals 5–14 and 5–15 so as to simultaneously connect the twelve pin terminals and bus terminals. The details of the connection of the terminals 5–14 and 5–15 will be discussed in connection with FIG. 6. FIG. 5(*b*) depicts the simplified diagram for the pick coil as utilized in FIG. 6. The pick coil 5–17 in FIG. 5(*b*) is designated by the letters TP to signify its connection in the TO matrix. For a circuit array of 144 by 144 pins, there are 1,728 relays like that shown in FIG. 5.

FIG. 6

FIG. 6 depicts the FROM and TO PAC Selection Matrices 6 and 7 (also identified as half-select units) shown in FIG. 3(*a*). The FROM relays 6–1 (shown in more detail in FIG. 4) and the TO relays 6–2 (shown in more detail in FIG. 5) have their coils connected in rows and columns. For simplicity's sake, the rows and columns are given names for identification purposes. The twelve columns are designated as PAC A, PAC B, . . . , PAC L along with the designation of FROM or TO. The PAC buses emanate from the PAC drivers 6–4 and the TO PAC buses emanate from the TO drivers 6–6.

The rows are identified in groups of twelve, each group being called a RAT and specified as either TO or FROM. The twelve TO ROW lines in RAT A emanate from the twelve row drivers 6–8 (only No. 1 and No. 12 being shown). Similarly, the twelve ROW buses in the TO RAT B emanate from the RAT B twelve row drivers 6–9. In a similar manner, the TO ROW lines emanate from the TO row drivers 6–12.

The Lower Order ROW lines emanate from the Lower Order row drivers 6–14 in a manner similar to those from the FROM and TO drivers.

For simplicity, FIG. 6 only depicts RAT A and RAT B as typical of the twelve RATS which would be required to define the rows in a 144 by 144 circuit array. Also the PACS A, B, and C are the only three of the twelve PACS which would be required in the 144 by 144 array.

Each FROM relay 6–1 has its FP coil connected to a PAC line and to a ROW line. For example, the relay designated as being at the intersection of RAT A, ROW 1, and PAC A is connected to PAC A at terminal 6–22 and to ROW 1 at terminal 6–21. The other FROM relays are connected in a similar manner. The FH coils are connected only by a L.O. ROW line such as at terminal 6–19 (the other terminal of the FH coils being grounded as previously indicated in FIG. 4). The TO relays have both a ROW and PAC line and consequently, can be designated as the intersection of a ROW (in a specified RAT) and a PAC.

The driver circuits 6–4, 6–6, 6–8, 6–9, 6–12, and 6–14 are conventional circuits well known to those skilled in the art. The circuits function to convert the input low power control signals to the appropriate power levels necessary to energize the relays. The circuits may include SCR's (Silicon Control Rectifiers) or other power level components. Furthermore, if bistable connectors other than relays are utilized (such as transistors or similar switching elements) the power requirements of the drivers may be reduced.

The half-select units of FIG. 6 operate on the principle of coincident selection. That is, to select either a TP or FP (pick) coil, it is necessary to energize both a ROW and a PAC line. The relay which is energized is that one which is coincident to the particular ROW (the RAT being specified) and the PAC.

Selection of the particular PAC desired results from the address recorded in the twelve X-stages of the registers 3–23 and 3–25 [shown in FIG. 3(*b*)]. The twelve stages in the TO register 3–23 are gated to the PAC drivers 6–6. Note that the circle 6–30 containing the designation 12 PAC merely indicates the number of lines gathered together and represented thereafter by a single line. In a similar manner, the twelve PAC stages in the FROM REGISTER 3–25 are gated into the PAC drivers 6–4.

Since the function of the PAC Selection Matrices of FIG. 6 are to half-select pins which are to be connected to the TRUNKS 3–12 or 3–18 of FIG. 3(*a*) or to ground terminal 3–14 or 3–16, the PAC and ROW lines can be termed quarter-select means in that it requires a PAC and ROW line (two quarters) to make the full half-selection.

For the purposes of this invention, half-selection is defined as the energization or switching of an element which when combined with the energization or switching of a second similar element completes the ultimate energization or selection desired. For example, each of the FROM relays 6–1 and associated circuitry in the PAC Selection Matrices of FIG. 6 is a half-selection means in that least one of those along with one of the relays 10–2 or 10–10 in the FROM PIN Selection Matrix of FIG. 10 must be energized in order to select the desired pin or pins in the circuit array 2. The relays of FIG. 10 and the associated circuitry are, therefore, also half-selection means.

Also for the purposes of this invention, quarter-selection is defined as the simultaneous energization or switching of at least two quarter-select means so as to fully energize a half-selection means. For example in FIG. 6, the FROM PAC A driver and associated lines and circuitry comprise one quarter-select means associated with the FROM relay 6–1. Similarly, the FROM ROW 1 driver 6–8 and associated lines and circuitry are another quarter-select means which together with the just mentioned quarter-select means are operative to select the relay 6–1 when both are energized.

The selection of the RAT and ROW lines is also from the RAT and ROW stages in the registers 3–23 and 3–25. The RAT and ROW selection, however, is further decoded in the group-size decoders 3–48 and 3–47 which will now be explained in further detail.

FIG. 7

Figure 7A:
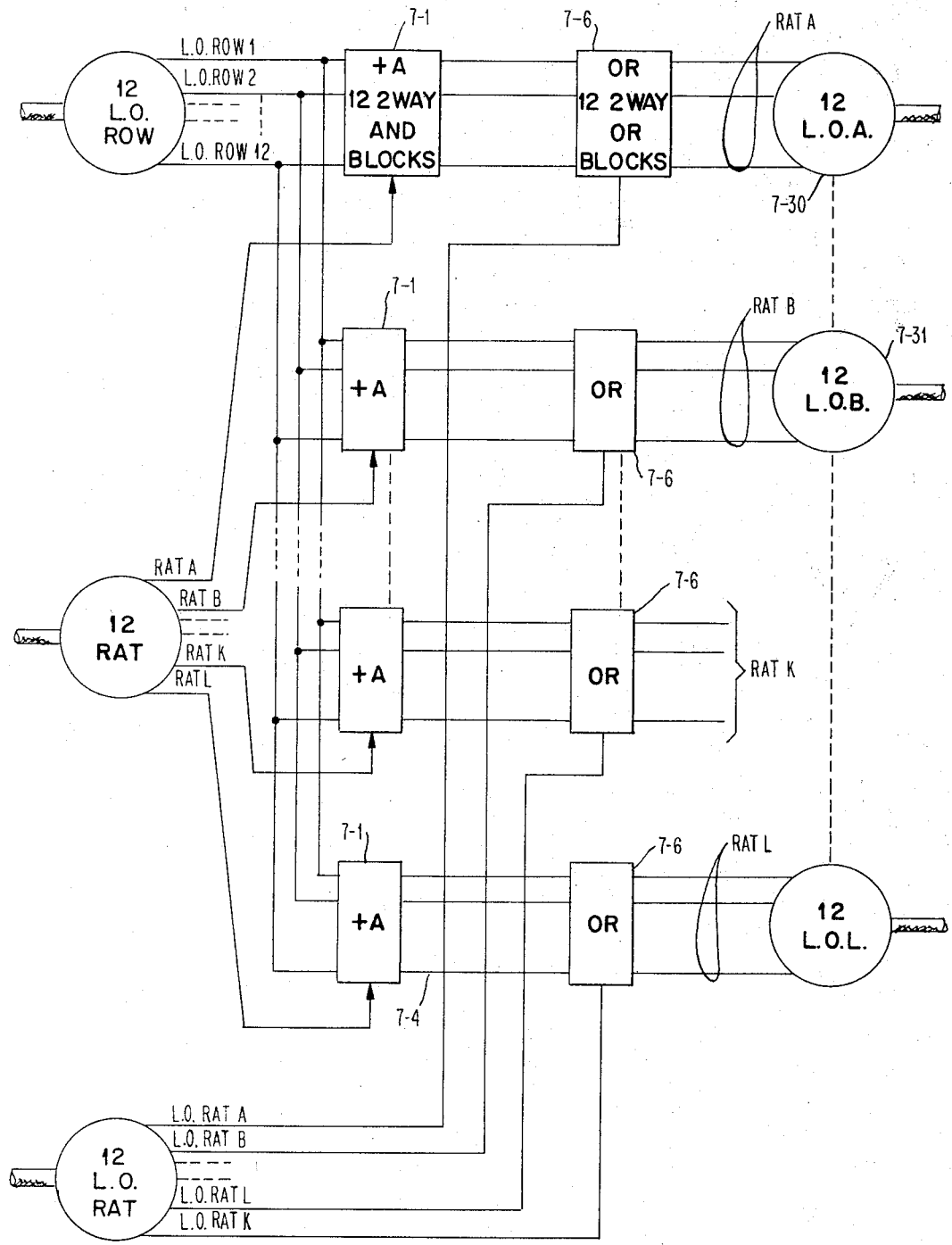

FIG. 7(a) depicts a group-size decoder associated with the L.O. (Lower Order) FROM hold coils described in detail in FIG. 6. The twelve L.O. A lines (designated by the circle 7–30) are connected to the L.O. A lines in FIG. 6 (designated by circle 6–30). In a similar manner, the twelve L.O. B lines (designated by the circle 7–31) are connected to the twelve L.O. B lines (designated by circle 6–31) which of course feed the low order ROW drivers 6–14 or RAT A. The thirty-six input lines to the decoder of FIG. 7(a) (designated by the three circles containing twelve L.O. ROW, twelve RAT, and twelve L.O. RAT) are gated from the stages of the registers 3–23 and 3–25 shown in FIG. 3(b). These input lines are energized or not according to whether or not the particular stages in the registers to which they are attached are energized or not. The twelve L.O. ROW lines feed AND's 7–1 in a parallel fashion. Each L.O. ROW line 1, 2, . . . , 12 feeds each AND 7–1. The twelve RAT line inputs A, B, . . . , K, L each feed a separate AND 7–1. In operation, the register stages are gated out to select a particular ROW. Since each RAT contains twelve ROWS, the decoder of FIG. 7(a) by means of the AND's 7–1 determines which RAT the selected ROW should appear in. For example, if L.O. ROW 2 were selected and RAT B were desired and selected, then the lines 7–2 would be the one selected. If L.O. ROW 12 were selected and also RAT L then line 7–4 would be selected.

The 12 L.O. RAT lines A, B, . . . , L are connected respectively to the 12 OR's 7–6. The function of the OR's is to select all the ROWS in the particular RAT selected. For example, if the L.O. RAT A line is selected, then the 12 L.O. A lines (indicated by circles 7–30) are selected. If the L.O. RAT B line is selected then the 12 L.O. B lines (designated by circle 7–31) are selected, and so on.

FIG. 7(b) shows in more detail the connections of the AND's 7–1 and the OR's 7–6. FIG. 7(b) shows only the lines associated with RAT A and RAT B for the purpose of simplicity. In FIG. 7(b), the twelve two-way AND's 7–10 correspond to one of the AND's 7–1 in FIG. 7(a). Each of the two-way AND's 7–10 has an input line from one of the twelve RAT inputs such as the RAT A line designated by 7–11. In addition, the 12 AND's 7–10 each have a different L.O. Row line which are connected in common to the L.O. ROW inputs to the other two-way AND's such as the AND's 7–12 in RAT B. The outputs from the 12 AND's 7–10 feed one input of the two-way OR's 7–14. The other input to the OR's 7–14 is from the L.O. RAT A line. In a similar manner, the L.O. RAT B line feeds the OR's 7–15 which have inputs from the AND's 7–12.

In operation, the selection of a L.O. RAT line energizes all the OR's associated with a particular RAT and therefore energizes the 12 Row Drivers such as 6–14 shown in FIG. 6 [also shown in FIG. 7(b) by dotted lines]. In order to select one ROW at a time, it is necessary to select a RAT and a L.O. ROW line. For example, in order to select the Lower Order ROW 1 driver 6–14 of FIG. 6, it is necessary to select the RAT A line and the L.O. ROW 1 line.

FIG. 8

FIG. 8(a) depicts the group-size decoder similar to that shown in FIG. 7. The FIG. 8 decoder is used for both the FROM and TO group-size decoders 3–48 shown in FIG. 3(a). The groups of twelve output lines 12A, 12B, . . . , 12L go to the pick fold row drivers 6–8, 6–9, and the others (not shown) of FIG. 6 as designated by the circles labeled 12A and 12B in FIG. 6. There are, therefore, two decoders such as shown in FIG. 8—one for the TO lines and the other for the FROM lines.

Figure 8B:
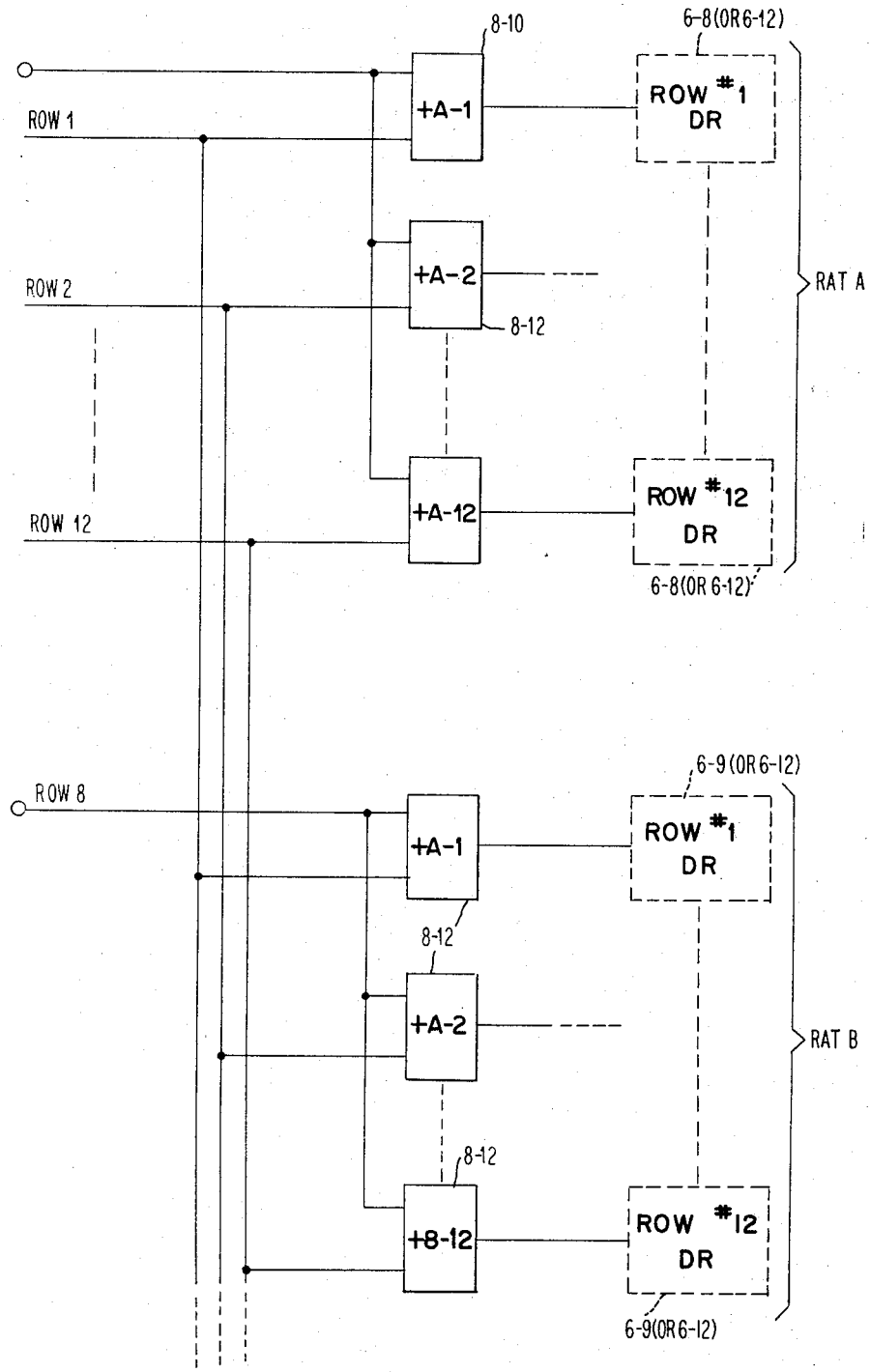
FIG. 8(b) shows the circuit of FIG. 8(a) in greater detail.

The inputs, 12 ROW lines and 12 RAT lines, come from the stages of the registers 3–23 and 3–25 shown in FIG. 3(b). The AND's 8–1 are the asme as the AND's shown in connection with FIG. 7. The connection of the RAT and ROW lines is also the same. The principal difference between FIG. 8 and FIG. 7 decoders being the lack of the OR circuits in the FIG. 8 decoder. FIG. 8(b) depicts the circuit of FIG. 8(a) in greater detail and is analogous to FIG. 7(b). The twelve two-way AND's 8–10 are identical to the AND's 7–10 of FIG. 7 and operate in the same manner. The AND's 8–10 connect to the ROW drivers 6–8 shown in FIG. 6 [shown as dotted lines in FIG. 8(b)]. In a similar manner, the RAT B AND's 8–12 connect to the RAT B Row Drivers 6–9. In the case of the TO Row Drivers the Row Drivers shown in FIG. 8(b) would, of course, be connected to the RAT A an RAT B Row Drivers 6–12.

FIG. 9

FIG. 9 depicts the half-select unit 3–9 of FIG. 3(a) in greater detail. The twelve output buses a, b, . . . , k, l designated as 12P in the output circle, connect to the twelve bus lines also designated 12P in FIG. 11.

The input lines, 12 PIN and 11 L.O. PIN, are derived from the stages of the TO register 3–23. The FIG. 9 TO pin selection matrix also has a connection to the TO TRUNK at terminal 9–12 which is connected to the terminal 3–12 in FIG. 3. Similarly, the FIG. 9 circuit has a terminal connection 9–14 connected to the ground terminal 3–14 of FIG. 3(a).

The pin selection matrix of FIG. 9 consists of twelve 4-poled relays 9–1 which, when energized, connect the bus lines a, b, . . . , l to the TO TRUNK 9–12. Upon energization of one of the input 12 PIN lines corresponding to the energization of one of the 12 PIN stages in the TO register 2–23, the appropriate relay driver 9–3 is energized thereby energizing the appropriate relay coil 9–1 closing the contacts 9–4 and connecting the bus line, for example a, to the TO TRUNK 9–12.

Alternatively, the bus lines a, b, . . . , l can be connected to the ground line 9–14 by means of the 11 L.O. PIN relays 9–6. The relays 9–6 operate when the relay drivers 9–7 receive a signal from the 11 L.O. PIN inputs. For example, the L.O. relay 1 upon energization closes its contact 9–8 thereby connecting the bus a to the ground line 9–14. It should be noted that the eleven L.O. PIN relays 9–6 can be operated independently thereby providing the ability to close one or more relays at a time.

FIG. 10

Figure 10:
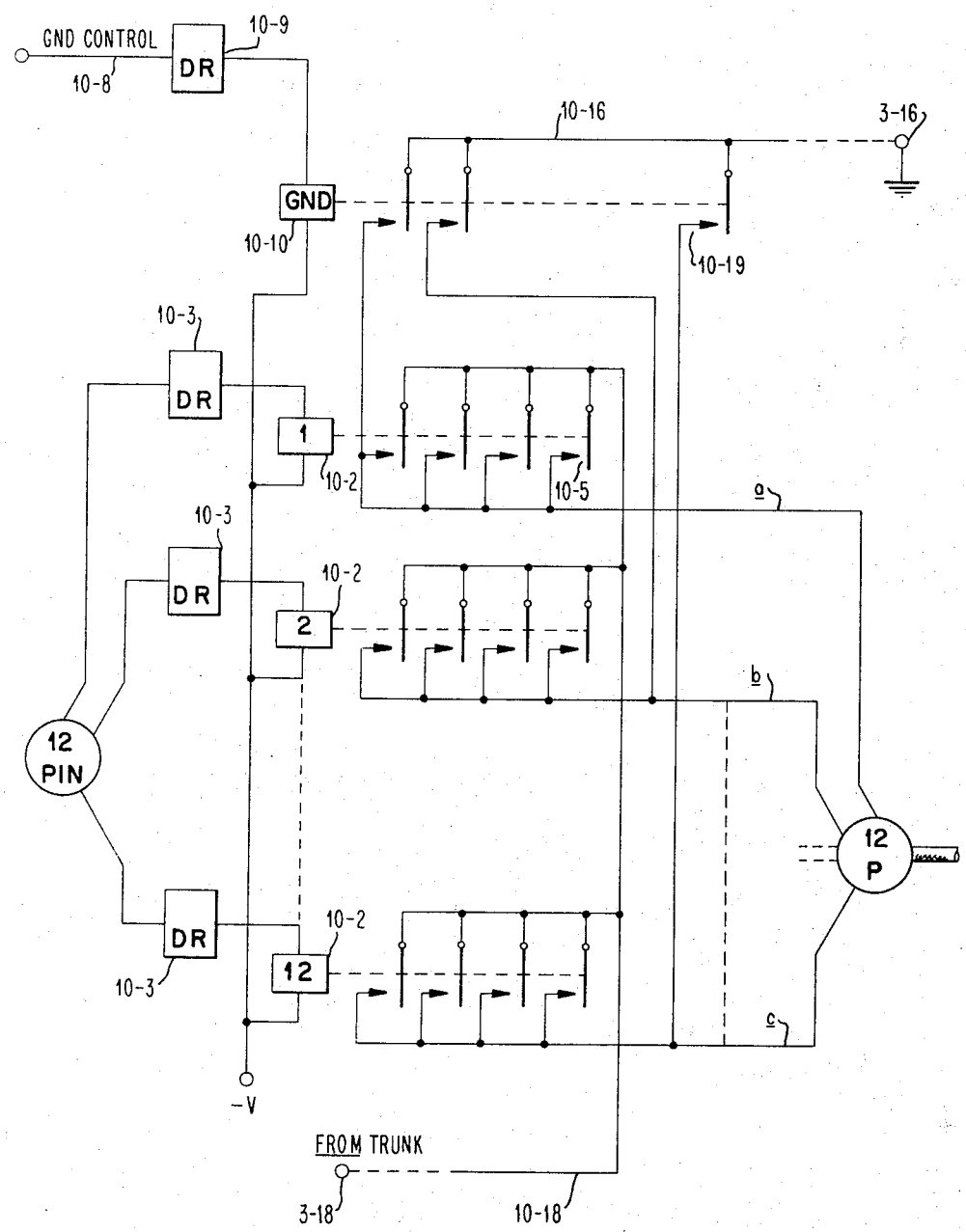
FIG. 10 shows a half-select unit comprised of a FROM PIN Selection Matrix.
Figure 11:
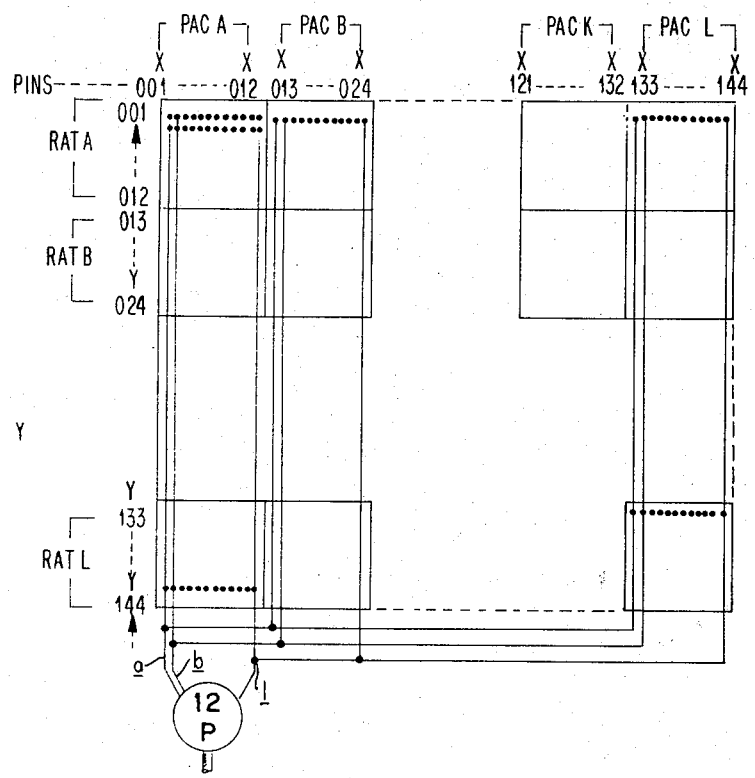
FIG. 11 shows an array-interconnection circuit of which there are two—one to interconnect the TO PIN Selection Matrix with the TO PAC Selection Matrix, and one to connect the FROM PIN Selection Matrix to the FROM PAC Selection Matrix.

FIG. 10 depicts the FROM half-select unit 3–10 of FIG. 3(a). Like FIG. 9, the FIG. 10 FROM PIN Selection Matrix has output buses a, b, . . . , l designated in the circle as 12P which connects to a matrix interconnection array shown in FIG. 11 and discussed in connection with FIG. 9. Accordingly, there are two matrix interconnection circuits, one associated with the TO relays of FIG. 6 and one associated with the FROM relays of FIG. 6 so that the circuits of FIG. 9 and FIG. 10 are not interconnected.

Similar to the FIG. 9 TO matrix, the FIG. 10 FROM matrix has 12 PIN lines gated from the 12 PIN stages of the FROM register 3–25. In addition, the FROM MATRIX is connected to the FROM TRUNK by line 10–18 connected to the terminal 3–18 shown in FIG. 3(a). Similarly the line 10–16 connects to the ground terminal 3–16 of FIG. 3(a). The bus lines a, b, . . . , l are connected to the FROM TRUNK by means of the bistable connectors shown as relays 10–2. The relays 10–2 are energized from the appropriate signals on the 12 PIN stages of the FROM register 3–25. For example, if the first PIN line is energized, relay coil 1 of the relays 10–2 is energized (the opposite side of the coil being connected to the voltage −V) closing the contacts 10–5 and connecting the bus a to the FROM TRUNK line 10–18. By means of the 12 PIN lines the relays 10–2 operate to connect the bus lines a, b, . . . , l one at a time to the FROM TRUNK.

When it is desired to connect all the bus lines $a$, $b$, ..., $l$ to ground simultaneously, the GND Control Line 10–8 passes a signal to the driver 10–9 which energizes the GND relay 10–10 which has its opposite side connected to the —V potential. Upon energization of the relay 10–10, the 12 contact points 10–19 are closed connecting all the bus lines $a, b, ..., l$ to the ground terminal line 10–16.

FIG. 11

See discussion with reference to FIG. 4.

FIG. 12

Figure 12:
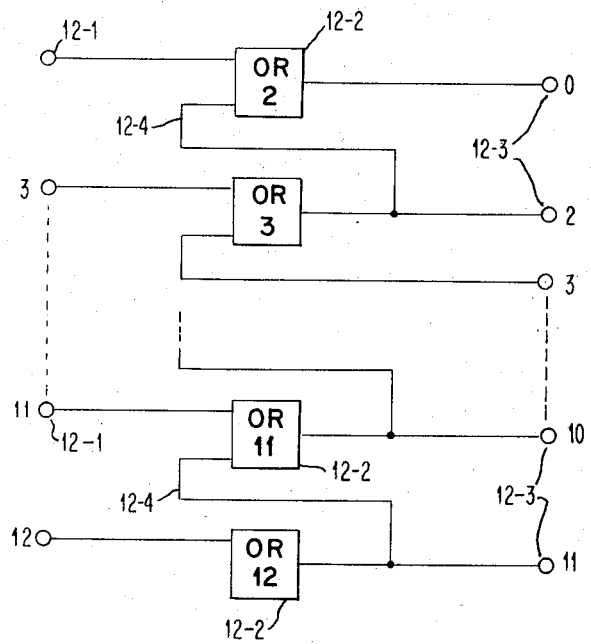
FIG. 12 shows the details of the Lower Order Select units appearing in FIG. 3(b).

The lower order selection units 3–41 of FIG. 3(*b*) are typically, in the preferred embodiment, composed of OR circuits connected as shown in FIG. 12. The selection units 3–41 would consist of four units like the one shown in FIG. 12, one each for the 12 PAC, 12 PIN, 12 ROW, and 12 RAT stages. The connections are the same for each of the four sets of 12 stages and therefore only one group of stages, 12 RAT, will be described. In FIG. 3(*b*), the eleven stages 2, 3, ..., 11, 12 RAT stages are connected to the inputs 12–1 of the FIG. 12 circuit. The eleven inputs 12–1 are connected respectively to the eleven OR's 12–2. The OR's 12–2 have eleven outputs 12–3 which, as shown in FIG. 3(*b*), are gated out to the OR block 3–44. Referring again to FIG. 12, the outputs of each OR 12–3 is also connected back by lines 12–4 to the input of each next lower OR, that is, the output of OR 12 is connected to an input of OR 11 and so on until the output of OR 3 is connected to the input of OR 2.

In a typical operation, the energization of the third stage of the 12 RAT stages of the TO register 3–23 automatically energizes input 3 of the inputs 12–1 in FIG. 12. With input 3 energized the OR 3 yields an output on terminal 2 and terminal 1 of outputs 12–3. Note that with the described input, terminals 3, 4, ..., 10, 11 of outputs 12–3 are not energized. Similarly, energization of input 11 would yield an output on output terminals 1, 2, ..., 9, 10 but would not yield an output on 11. An output from the first stage of the 12 RAT would not yield an output on any of the lower order RAT lines.

GENERAL OPERATION

One function of the disclosed apparatus is to perform electrical tests on circuit arrays which, in general, include a large number of terminal points or pins. Although any number of tests can be performed, two typical tests are a short test and an open test.

As indicated with reference to FIG. 2(*a*), the circuit array may be organized into networks snch as net 2–5 connecting pins (002,013), (072,048), and (090,084). Such a network is called a multiple-pin net. Consistent with that terminology, a net may consist of a single pin in which case it is called a single-pin net. Every net in the circuit array may be tested for shorts and opens using the apparatus of the present invention in a fast and efficient manner. The shorts' test may employ, in the preferred operation, a method as disclosed in the copending application having S.N. 609,026.

Briefly, the shorts' test consists of checking the pin of lowest order in a network against all pins in the circuit array of lower order than that pin. That testing is carried out by grounding all the lower order pins and connecting them to one side of a test unit (such as unit 8 of FIG. 2) and connecting the other side of the test unit of FIG. 2. If, after energizing the test unit, continuity exists between that network pin and the lower order pins, an undesired electrical connection exists and therefore the circuit array is faulty. The shorts' test is completed for each net in the circuit array. If the test for each net indicates that there was not continuity between the lowest order net pin and all the lower order pins then every net in the circuit array is properly isolated from every other net in the array.

After having determined that the nets are properly isolated by means of shorts' tests, each net is checked for opens. The opens check, in a preferred operation, is carried out by first selecting the lowest order pin and connecting it using the coincident selection circuitry to one side of the test unit and then, selecting a second pin in the network and connecting it to the other side of the test unit. With these connections, the test unit is energized to detect an open between the lowest order pin and the second selected pin. After continuity is determined between these two pins, the second pin remains connected to the test unit and a third pin is selected to be connected to the side of the test unit previously connected to the lowest order pin. With this connection, the test unit is energized to determine if an open exists between the second and third pins. Thereafter, a fourth pin replaces the connection of the second pin and the opens check is performed. This procedure continues until all pins in the net have been checked. It should be noted that if the opens test reveals any errors, the short test is invalid and must be performed again when the opens errors have been corrected.

If, when performing the shorts' test, an undesired short connection is indicated, a further function of the disclosed device is to identify the particular pins or pins which are causing the error. The identification is carried out by a scan routine which sequentially scans by RATS until a particular RAT is found containing an error, then scans by ROWS within that RAT until a particular ROW containing an error is found, then scans by PACS within that ROW, and finally scans by PINS within a particular PAC. After completing the scan by PINS and detecting the error pin and after completing the particular PAC by PIN scanning, a scan by PACS is reinitiated and continued until the particular ROW has been completely scanned by PCS (unless, of course, the particular PAC scanned was the last PAC in the ROW). After this second PAC scan, a scan by ROWS is carried out until the ROWS in the RAT are finished out. Finally, the circuit array is scanned by RATS until a new error is detected or the circuit array has been fully tested. If at any time a new error is detected, the size of the group being scanned is reduced to the next lower size. For example, as previously explained, if an error is detected during a ROW scan, then the group size is shifted to PACS. If a RAT scan is being performed, then upon detection of an error the group size is shifted to ROWS, and so on.

The shorts' test, the opens test, and the scanning routine are all supervised by a control unit. The control unit contains the addresses of the nets to be tested with means for identifying the lowest order pin therein. The control unit also contains various supervisory control instructions necessary to operate the transfer of addresses into the TO and FROM registers. Furthermore, the unit requires some decision making capability and further supervisory control instructions for operating the gates from the address registers and for controlling the group size decoders. The details of the connections and functions will be readily apparent to those skilled in the art from the following description of the detailed operation.

DETAILED OPERATION

The detailed operation will be explained with reference to an example first considering a short test and second a scanning routine, and finally an open test.

Short test

Referring to FIG. 2(*a*), the net 2–5 connecting the pins (002,013), (030,032), (072,048) and (090,084) must be checked against the lower order pins when they are all connected in common. This check is made by taking the lowest order pin and net 2–5, that is, pin (002,-013) and selecting it using the FIG. 3 apparatus. After that pin has been selected, all the lower order pins are selected and are connected to one side of the test unit. The pin (002,013) is then connected to the other side of the test unit and a test is run to determine if any shorts exist.

Referring to FIG. 1(b), the address of the first pin (002,013) is initially furnished by the central processor and storage 11 along with the addresses of the other pins in net 2–5. The first pin in each net of pins, here the (002,013) pin, is the lowest order pin in that net. When the unit 11 dictates with an instruction that the net 2–5 is to be tested for shorts, the Instruction and Storage Unit 4 causes the lowest order pin address to be decoded in unit 3–21 and read into TO register 3–23. The pin (002,013) in decoded form is in RAT B, ROW 1, PAC A, and PIN b. Accordingly in the X stages of the TO register, the first stage of the 12 PAC stages (corresponding to PAC A) and the second stage of the 12 PIN stages (corresponding to PIN b) are energized. In the Y stages, the first stage of the 12 ROW stages (corresponding to ROW 1) and the second stage of the 12 RAT stages (corresponding to RAT B) are energized. With the address of pin (002,013) properly written into the TO register 3–23 as indicated, gate control 3–27 gates out the full TO register as is indicated by box 3–31. The 12 ROW and 12 RAT outputs from box 3–31 are gated to the group-size decoder 3–48 for the TO PICK COIL as shown in FIG. 3(a). As shown in more detail in FIG. 8, the TO register output energizes, in FIG. 8(b), the RAT B line and the A1 AND of the 8–12 AND's. The RAT A AND's (8–10) are not energized nor are the other RAT B AND's 8–12. The output from the A1 AND energizes the TO ROW 1 DR 6–12 as shown in more detail in FIG. 6. The TO ROW 1 driver energizes the line feeding the TP relay 6–33 in a manner which can be designated as quarter-selecting. The other quarter-select line feeding relay 6–33 is energized by TO drivers 6–6 and in particular the TO PAC A driver which was, of course, energized by the gating from the 12 PAC stages of the TO register 3–23.

The energization of a TP relay by the two quarter-select lines (PAC and ROW in the designated RAT) half-selects twelve pins by connecting the pin contacts 5–1, 5–2, . . ., 5–12 to the twelve bus contacts a, b, . . ., l, respectively, as shown in more detail in FIG. 5(a). The twelve pins half-selected have the addresses (001,013), (002,013), (003,013), . . ., (012,013).

The other half-selection is accomplished by means of the output gated from the 12 PIN stages of the TO register 3–23 of FIG. 3(b). For the pin (002,013), the b or second stage is gated to the half-select unit 3–9 for the TO PIN Selection Matrix shown in FIG. 3(a). The TO PIN Selection Matrix is shown in more detail in FIG. 9. The second stage gated out from the TO register energizes in FIG. 9 the 2 DR of the drivers 9–3 which in turn energizes relay 2 of the relays 9–1. Energization of relay 2 closes the associated contacts 9–4 thereby connecting the b bus to the TO TRUNK via line 9–12. Since none of the other relays 9–1 are energized the b bus is the only one connected to the TO TRUNK. Since the b bus through output lines 12P connects to the b terminal of typical relay shown in FIG. 5(a), the pin connected to the terminal 5–2 is the only one selected. In the example discussed that pin is, of course, the one having the address (002,013).

With the (002,013) pin connected to the TO TRUNK, there remains the selection and common connection of all the lower order pins in order to complete the preparation for the short test. The lower order selection is achieved by means of the lower order select unit 3–41 shown in FIG. 3(b). With pin (002,013) selected, the TO register 3–23 under the control of gate control 3–27 reads out RAT B, ROW 1, PAC A, and PIN b into the lower order selection unit 3–41. With reference to FIG. 12, the particular unit associated with the 12 RAT stages would have the 2 terminal of the inputs 12–1 energized and therefore, the only output would be at terminal 1 of the outputs 12–3. The lower order unit associated with the 12 ROW stages would have no output on terminal 1 because the first row provides no L.O. output. Similar to the L.O. RATS, the lower select unit associated with the 12 PIN stages would again have the output only on its terminal 1. The lower order select unit associated with the 12 PAC stages would have no output since PAC A would indicate that the first stage of the 12 PAC stages was the one energized in the TO register, and therefore, did not have an input to the lower order select unit.

Upon a proper gating signal from the gate control 3–27 in FIG. 3(b), the ouput from the lower order select unit 3–41 would pass through the OR 3–44 to the group size decoder 3–47 of FIG. 3(a) as shown in more detail in FIG. 7. At the same time that the lower order select units 3–41 are gated, the TO register 3–23 has its 12 RAT stages gated through an OR 3–43 to the group size decoder 3–47 as indicated by box 3–33 in FIG. 3(b).

In the hold coil decoder of FIG. 7(b), the L.O. RAT A line is energized by the output from the lower order select unit and in turn energizes all the OR's 7–14. The L.O. FROM Hold Coil Decoder of FIG. 7(b) in turn energizes, for pin (002,013), all the Lower Order ROW drivers 6–14 designated 1, 2, . . . , 12 and associated with the L.O. RAT A thereby completing the half-selection of the lower order pins.

The half-selection accomplished by the FROM PAC selection matrix 7 is complemented with another half-selection carried out by the FROM Pin Selection Matrix 10 of FIG. 3(a) as shown in more detail in FIG. 10. In FIG. 10, the GND Control 10–8 is energized by a gated output (not shown) of the gate control 3–27 of FIG. 3(b). The GND Control 10–8 connects all the buses a, b, . . . , l to the ground line 10–16. Since the buses are interconnected with the FROM relays of FIG. 6 which were previously half-selected, the grounding of the buses by the FIG. 10 circuit completes the full selection of all the lower order pins in the lower order RATS, ROWS, PACS. The lower order pins within the PAC A of the selected pin (002,013) are not selected by the FROM half-selection units.

The lower order selection of the lower order pins within the PAC A of the selected pin (002,013) is achieved by the TO half-selection units 3–6 and 3–9 of FIG. 3(a). The TO PIN selection matrix 3–9 receives a gated output from the 11 L.O. PIN stages of the lower order selection unit 3–41 of FIG. 3(b) as shown in more detail in FIG. 9. In FIG. 9, with reference to the lower order pins of pin (002,013), the L.O. relay 1 of the relays 9–6 is energized as a result of the signal on output terminal 1 of output 12–3 of the L.O. selection unit corresponding to the 11 L.O. PIN stages shown in FIG. 12. The energization of the L.O. 1 relay connects the bus a to the ground line 9–14. Since the PAC A containing the pin (002,013) is already energized in connection with the selection of that pin as previously described, the grounding of the a bus completes the selection of all the lower order pins.

With all the lower order pins grounded and with the selected pin (002,013) connected to the TO TRUNK the test unit 8 (shown in FIG. 1) is energized to perform a test to determine if any connection exists between that pin and any of the lower order pins. If no connection exists, the address of the lowest order pin in a new net is read into the TO register 3–23, that pin is selected by the TO half-select units, the lower order pins are selected, and another test is run. If at any time, a short is discovered, a scan routine is run to determine which pin or pins are shorted to the lowest order pin selected in a manner now to be described.

*Scan routine*

The scan routine is run by first selecting the pin to be tested by means of the TO half-selection matrices. That pin is the lowest order pin in a net. The scan routine follows a short's test and accordingly, the lowest order pin is already selected as previously explained.

The next step is to select large groups of elements and connect them in common and thereafter by means of the test unit, check to see if they are shorted to the pin under test as selected by the TO units. On entering the scan routine, the first cycle will be a RAT scan cycle in which the tester scans 12 rows in the Y direction. If no short is encountered, the tester will scan the next 12 rows and will continue scanning, 12 rows at a time, until a RAT is encountered in which a short exists. When the short is found, the tester will transfer into ROW scan and then will proceed to scan each row in the RAT until the ROW where the short exists is found. Upon finding the short in the ROW, the tester will switch to PAC scan where the tester will scan each PAC within the ROW to find the PAC where the short exists. When the PAC is found, the tester will transfer to PIN scan to find which of the 12 pins within the PAC is shorted.

The RAT scan is initiated, referring to FIG. 1(b), under the direction of the Scan Control 5. When a short test detects a short, Test Unit 8 gates a signal to the Scan Control 5 using conventional logic and gate circuitry thereby initiating a Scan Routine. At the beginning of a Scan Routine, the scan counters (X and Y) are always preset to binary 001. Since scanning is initially by RATS, the binary 001 of the Y counter is passed through Decoder 3–21 and gated to the FROM register 3–25 thereby energizing the first (RAT A) stage. The 12 RAT output 3–38 has its first stage energized indicating that RAT A is the first to be scanned. The output gated from box 3–38 is fed through OR 3–44 through the distributor 3–46 [referring now to FIG. 3(a)] to the group size decoder 3–47 for the L.O. FROM Hold Coils. Referring to FIGS. 7, the L.O. RAT A line is energized thereby energizing all the OR's 7–14 which in turn energizes all the lower order ROW DR's associated with L.O. RAT A in FIG. 6. The ROW DR's in turn energize all the FH coils in RAT A thereby completing the half-section of the pins in RAT A.

The full selection is completed by energization of the other FROM half-select unit 3–10 [FIG. 3(a)] and shown in more detail in FIG. 10. Referring to FIG. 10, the GND. Control 10–8 is energized by a line (not shown) from the gate control 3–27 of FIG. 3(b). This ground signal closes the relay contacts 10–19 thereby connecting all of the buses a, b, c, . . ., l to ground line 10–16. Since the buses are connected to the respective terminals on the FH coils as previously described in connection with FIG. 4(a), the ground control signal completes the full selection of all the RAT A pins.

With the pin under test selected by the TO circuitry and all the RAT A pins selected as described, the test unit 8 is energized and if no connection exists between that pin and all the RAT A pins, then the test unit 8 gates a signal to Scan Control 5 which causes the Y scan counter to advance by 12 to binary 013. The scan counter's binary 013 is decoded and gated to the FROM register 3–25 thereby energizing the second (RAT B) stage. After each RAT is tested and no short is detected, the 12 RAT stages are incremented by one as caused by advancing the Y scan counter by 12. When a short is detected within a RAT, the 12 RAT stages of the register 3–25 are not advanced, but alternatively, scanning is commenced by rows.

ROW scan is initiated when the test unit 8 gates a RAT error signal to the scan control 5 indicating that an error condition was detected in the RAT under test. This RAT error signal causes the Y scan counter to increment in steps of 1. For example, if no error is detected in RAT A and an error is detected in RAT B, the Y scan counter would be advanced from binary 013 one at a time to 024. Correspondingly, the second stage (RAT B), in the FROM register 3–25 12 RAT stages would remain energized and the ROW stages would be incremented by 1 with each increment in the scan counter. For each ROW increment, the RAT and ROW information from box 3–37 is gated to the group size decoder 3–47 in a manner analogous to the gating from box 3–38. With reference to FIG. 7, the particular selected RAT (e.g., RAT B) energizes the associated AND's (e.g., AND's 7–12). Thereafter, the L.O. ROW lines are incremented one at a time by the advancing count in the 12 ROW stages of the register 3–25. In the associated manner previously described, the selected FH coils defining the ROW are half-selected a row at a time. After the selection of each ROW, the test unit determines if the pin under test is shorted to any of the pins in the selected ROW.

When an error is detected in a particular ROW during a ROW scan, the incrementing of the 12 ROW stages of the register 3–25 is stopped and the mode of scanning is switched to PAC scan. A PAC scan is initiated by a ROW error signal from test unit 8 to scan control 5 which causes the X scan counter to be enabled and scan by increments of 12 in a manner similar to that previously described with reference to a RAT scan. For a PAC scan the register 3–25 is gated out according to box 3–36. The RAT and ROW stages are gated to the FROM group size decoder associated with the PICK coils. In the manner previously described, the group size decoder quarter-selects the desired FP coils in the FROM matrix shown in FIG. 6. The remaining quarter-selection is achieved by scanning the FROM PAC A, PAC B, . . ., PAC L lines one at a time by incrementing the count in the 12 PAC stages of register 3–25. During the PAC scan, all twelve of the 12 PIN lines are energized to connect the pin buses a, b, . . ., l to the FROM TRUNK or alternatively the GND. Control line 10–8 can be energized connecting all the buses to ground.

When a particular PAC in the specified ROW and RAT is found to contain a shorted pin, the count in the PAC, ROW, RAT stages remains fixed and the count in the PIN stages of the register 3–25 are incremented by causing the Y scan counter to increment 1 at a time in order to perform a PIN scan. Incrementing the stages of register 3–25, serially energizes the relays 10–2 of FIG. 10 thereby connecting the buses a, b, . . ., l to the FROM TRUNK thereby effecting the pin scan.

After scanning has been performed as previously indicated, the reverse procedure is applied, that is, a PIN scan is carried out to finish out a PAC, PAC scan is carried out to finish out a ROW, and ROW scan is carried out to finish out a RAT, and finally RAT scan is carried out to finish the whole circuit matrix.

*Opens test*

An opens test is carried out to determine the continuity between pins in a multiple pin net. The check is carried out by initially addressing with the TO circuitry a pin in the net to be checked [for example, the lowest order pin (002,013) of net 2–5 shown in FIG. 2(a)]. In an analogous manner, the second pin in the net (e.g., pin (030,032) is addressed by the FROM circuitry so that the lowest order pin is connected to the TO TRUNK and the next pin is connected to the FROM TRUNK. With these two connections, the test unit is energized to see if continuity exists. Thereafter, the instruction and storage unit 4 causes the address of a third pin in the net [e.g., pin (072,048)] to be read into register 3–23 and thereafter selected and connected to the TO TRUNK. In this second connection with pin (030,032) still connected to the FROM TRUNK and the pin (072,048) connected to the TO TRUNK the test unit again determines continuity. In a similar manner, the addresses of each new pin are alternately read into the FROM register 3–25 and the TO register 3–23 until all the pins in the multiple pin net have been tested.

While the invention has been particularly shown and described with reference to a preferred embodiment thereof it will be understood by those skilled in the art that the foregoing and other changes in form and details may be made therein without departing from the spirit and scope of the invention.

What is claimed is:

1. An apparatus for detecting electrical properties between a predetermined first group and a predetermined second group of elements in an array of elements comprising, first addressing means including,
   first half-select means for half-selecting a first domain of the elements contaning at least the predetermined first group, said first half-select means including a plurality of bistable connectors and including first quarter-select means and second quarter-select means connected to said bistable connectors and operative upon coincident energization to full-energize predetermined ones of said bistable connectors,
   second half-select means for half-selecting a second domain of the elements containing at least said predetermined first group,
   interconnection means interconnecting said first and second half-select means and intersecting the first domain with the second,
second addressing means including,
   third half-select means for half-selecting a third domain of the points containing at least the predetermined second group,
   fourth half-select means for half-selecting a fourth domain of the points containing at least said predetermined second group,
   array interconnection means interconnecting said third and fourth half-select means and intersecting the third domain with the fourth,
   control means including scanning means for energizing and scanning said first, second, third, and fourth half-select means whereby the predetermined first group is full-selected as the intersection of said first and second domains, and whereby the predetermined second group is full-selected as the intersection of said third and fourth domains,
   sensing means connected between said fiirst and second addressing means operative to detect electrical properties between said predetermined first and second groups.

2. The apparatus of claim 1 wherein said control means includes:
   a first register including first and second stages connected through gates to said first and second half-select means,
   a second register including third and fourth stages connected through gates to said third and fourth half-select means,
   whereby the control means gates signals from said registers to the half-select means to full-select the predetermined first and second groups.

3. The apparatus of claim 2 wherein said control means further includes:
   a first scan counter connected through gates to said first and third stages,
   a second scan counter connected through gates to said second and fourth stages,
   said scan counters operative to increment the addresses in the register stages for energization upon gating of the half-select means.

4. An apparatus for scanning an ordered array of elements by progressively addressing predetermined first, second, and subsequent groups of the elements where each group has an address defined by an X and a Y address component comprising:
   first half-select means for half-selecting a first domain of elements containing at least the predetermined group addressed including,
      a plurality of bistable connectors, a plurality of X quarter-select means and a plurality of Y quarter-select means for quarter-selecting said bistable connectors whereby the coincident energization of predetermined ones of said X and Y quarter-select means full energizes the bistable connectors associated with the first domain elements,
   an address register including X stages gated to said X quarter-select means and Y-stages gated to said Y quarter-select means operative to quarter-select the particular ones of said quarter-selecting means corresponding to the address in said X and Y stages, respectively,
   second half-select means for half-selecting a second domain of elements containing at least the predetermined group addressed,
   array interconnection means interconnecting said first and second half-select means and intersecting the first domain with the second domain,
   control means including a scan counter for progressively reading incremented X and Y address components into said register and for progressively energizing said first and second half-select means whereby the predetermined group addressed is full-selected as the intersection of said first and second domains.

5. The apparatus of claim 4 further including,
   a test unit for performing electrical tests,
   an addressing means including a third and fourth half-select means for selecting a group of test elements and connecting said test elements to the test unit,
   means connecting a said predetermined group to said test unit, to determine the electrical condition between said test elements and said predetermined group.

6. An apparatus for addressing an ordered array of elements by progressively addressing predetermined first, second, and subsequent groups of the elements where each group has an address defined by an X and a Y address component comprising,
   an address register including X-stages and first and second Y-stages,
   a group size decoder connected to receive signals gated from said Y-stages and operative to gate out the second Y-stages as a function of the state of the first Y-stages,
   first half-select means for half-selecting a first domain of elements containing at least the predetermined group addressed including,
      a plurality of bistable connectors, a plurality of X quarter-select means connected to receive signals gated from said X-stages and thereby quarter-select said bistable connectors
   whereby the coincidence energization of predetermined ones of said X and Y quarter-select means full energizes the bistable connectors associated with the first domain elements,
   second half-selection means for half-selecting a second domain of elements containing at least the predetermined group addressed,
   array interconnection means interconnecting said first and second half-select means for intersecting the first domain with the second domain,
   control means for gating signals from said X-stages to said X quarter-select means, for progressively gating said Y-stages and said group size decoder so as to energize said first half-select means, and for energizing said second half-select means whereby the predetermined group addressed is full-selected as the intersection of said first and said second domain.

7. The apparatus of claim 6 further including,
   a test unit for performing electrical tests,
   an addressing means including a third and fourth half-select means for selecting a group of test elements and connecting said test elements to the test unit, and
   means connecting a said predetermined group to said test unit whereby the electrical condition between said test elements and said predetermined group is determined.

8. The addressing apparatus of claim 6 further including,
a Y scan counter connected to the first and second Y-stages of said address register and operative to increment the count in said Y-stages.

9. An apparatus for addressing an ordered array of elements by progressively addressing predetermined first, second and subsequent groups of the elements where each group has an address defined by an X and a Y address component comprising,
an address register including first and second X-stages and first and second Y-stages,
an X scan counter connected to the X-stages and a Y scan counter connected to the Y-stages,
a group size decoder connected to receive signals gated from said Y-stages and operative to gate out the second Y-stages as a function of the state of the first Y-stages,
first half-select means for half-selecting a first domain of elements containing at least a predetermined group addressed including,
a plurality of bistable connectors,
a plurality of X quarter-select means connected to receive signals gated from said first X-stages thereby quarter-select bistable connectors and
a plurality of Y quarter-select means connected to receive signals gated from said group size decoder thereby quarter-selecting said bistable connectors, whereby the coincident energization
of predetermined ones of said X and Y quarter-select means full energizes and half-selects the bistable connectors associated with the first domain of elements,
second half-selection means including an X quarter-select means connected to receive signals gated from said second X-stages and operative with other quarter-select means to half-select a second domain of elements containing at least the predetermined group addressed,
array interconnection means interconnecting said first and second half-select means and intersecting the first domain with the second domain,
control means for gating signals from said first X-stages to said X quarter-select means as the X-stage's count is incremented by the X scan counter, for progressively gating said Y-stages and said group size decoder so as to energize said first half-select means, and for gating said second X-stages to energize said second half-select means whereby the predetermined group addressed is full-selected as the intersection of said first and said second domain.

10. The apparatus of claim 9 further including,
a test unit for performing electrical tests,
an addressing means including a third and four half-select means for selecting a group of test elements and connecting said test elements to said test unit,
means connecting a said predetermined group to said test unit, to determine the electrical condition between said test elements and said predetermined group.

References Cited
UNITED STATES PATENTS
3,370,232  2/1968  Wickersham _____ 324—73

RUDOLPH V. ROLINEC, *Primary Examiner.*

E. L. STOLARUN, *Assistant Examiner.*

U.S. Cl. X.R.

324—51